(12) United States Patent
Kim et al.

(10) Patent No.: US 10,093,561 B2
(45) Date of Patent: Oct. 9, 2018

(54) APPARATUS AND METHOD FOR TREATING BALLAST WATER

(71) Applicant: S&SYS CO., LTD., Hwasung-si (KR)

(72) Inventors: Jung Sik Kim, Cheongju-si (KR); Eui Yong Jung, Cheongju-si (KR); Dong Sung Kim, Cheongju-si (KR); Boong Ik Jung, Cheongju-si (KR)

(73) Assignee: S&SYS CO., LTD., Hwansung-si (KR)

( * ) Notice: Subject to any disclaimer, the term of this patent is extended or adjusted under 35 U.S.C. 154(b) by 548 days.

(21) Appl. No.: 14/631,809

(22) Filed: Feb. 25, 2015

(65) Prior Publication Data
US 2015/0307372 A1    Oct. 29, 2015

Related U.S. Application Data

(62) Division of application No. 13/055,546, filed as application No. PCT/KR2009/003756 on Jul. 9, 2009, now abandoned.

(30) Foreign Application Priority Data

Jul. 24, 2008  (KR) .................. 10-2008-0072176

(51) Int. Cl.
*C02F 1/467*    (2006.01)
*C02F 1/70*     (2006.01)
(Continued)

(52) U.S. Cl.
CPC .............. *C02F 1/4674* (2013.01); *C02F 1/70* (2013.01); *C02F 2103/008* (2013.01);
(Continued)

(58) Field of Classification Search
None
See application file for complete search history.

(56) References Cited

U.S. PATENT DOCUMENTS

| 6,835,307 B2 * | 12/2004 | Talbert | C02F 9/005 165/200 |
| 2005/0139530 A1 * | 6/2005 | Heiss | C02F 9/00 210/85 |
| 2006/0113257 A1 * | 6/2006 | Fernandez | B63J 4/002 210/756 |

* cited by examiner

*Primary Examiner* — Richard C Gurtowski
(74) *Attorney, Agent, or Firm* — STIP Law Group, LLC

(57) ABSTRACT

The present invention relates to an apparatus and a method for treating ballast water. The object of the present invention is to provide an apparatus and a method for precisely controlling the production, injection, and removal of disinfectants using electrolysis according to the flow rate of ballast water, wherein the ballast water flows into a ballast tank or is discharged from the ballast tank in order to manage the ballast water or ships so that the destruction or disruption of marine ecosystems can be prevented. For the above-mentioned object, the present invention provides an apparatus for treating ballast water and a treatment method using the same, wherein the apparatus includes: an electrolysis module (4) for producing concentration-controlled sodium hypochlorite; a gas-liquid separator (5) for separating hydrogen gas; a micro bubble generator (18) for mixing and supplying reducing agents while reducing residual chlorine by making micro bubbles in the ballast water; a vortex generator (19) for generating vortex; and a control system (12). The control system controls a salinometer (8), a flow rate meter (9), a residual chlorine meter (10), a seawater supply pump (2), flow rate control valves (3), an electrolysis module (4), a residual chlorine meter (16), a micro bubble generator (18), and an injection pump (15).

8 Claims, 14 Drawing Sheets

(51) Int. Cl.
*C02F 103/00* (2006.01)
*C02F 103/08* (2006.01)
(52) U.S. Cl.
CPC ...... *C02F 2103/08* (2013.01); *C02F 2209/05* (2013.01); *C02F 2209/29* (2013.01); *C02F 2209/40* (2013.01); *C02F 2303/04* (2013.01); *C02F 2305/02* (2013.01)

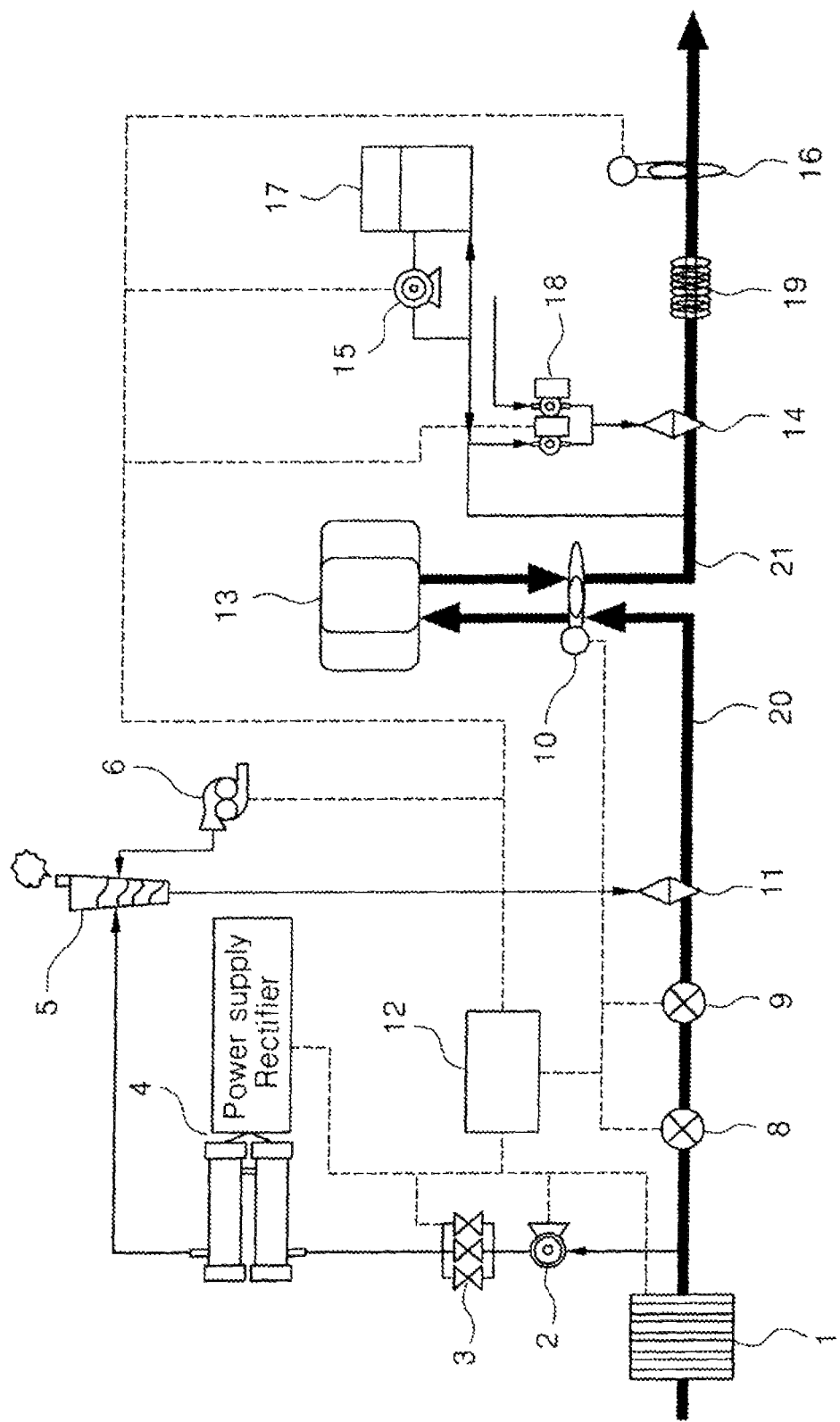
[Fig. 1]

[Fig. 2]
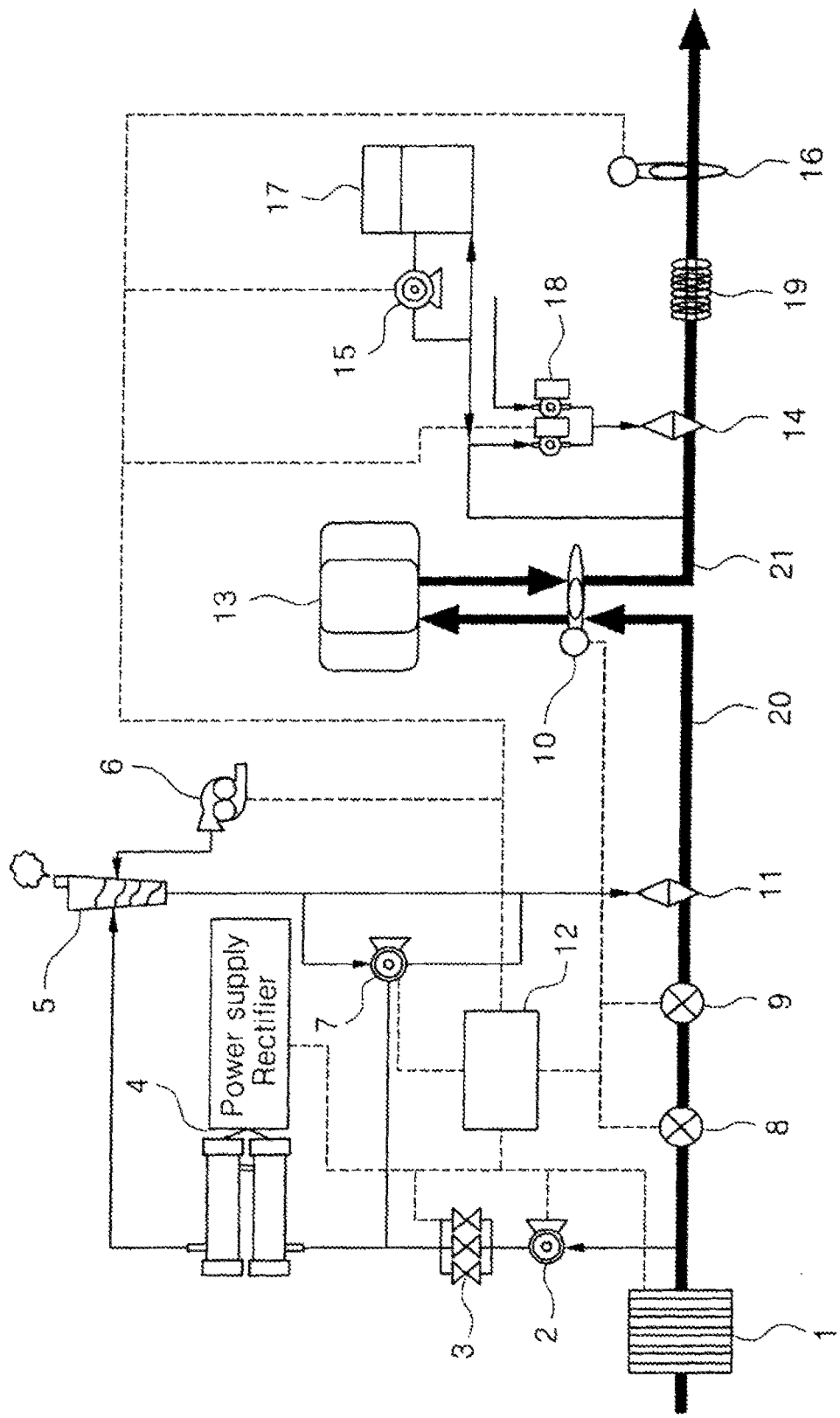

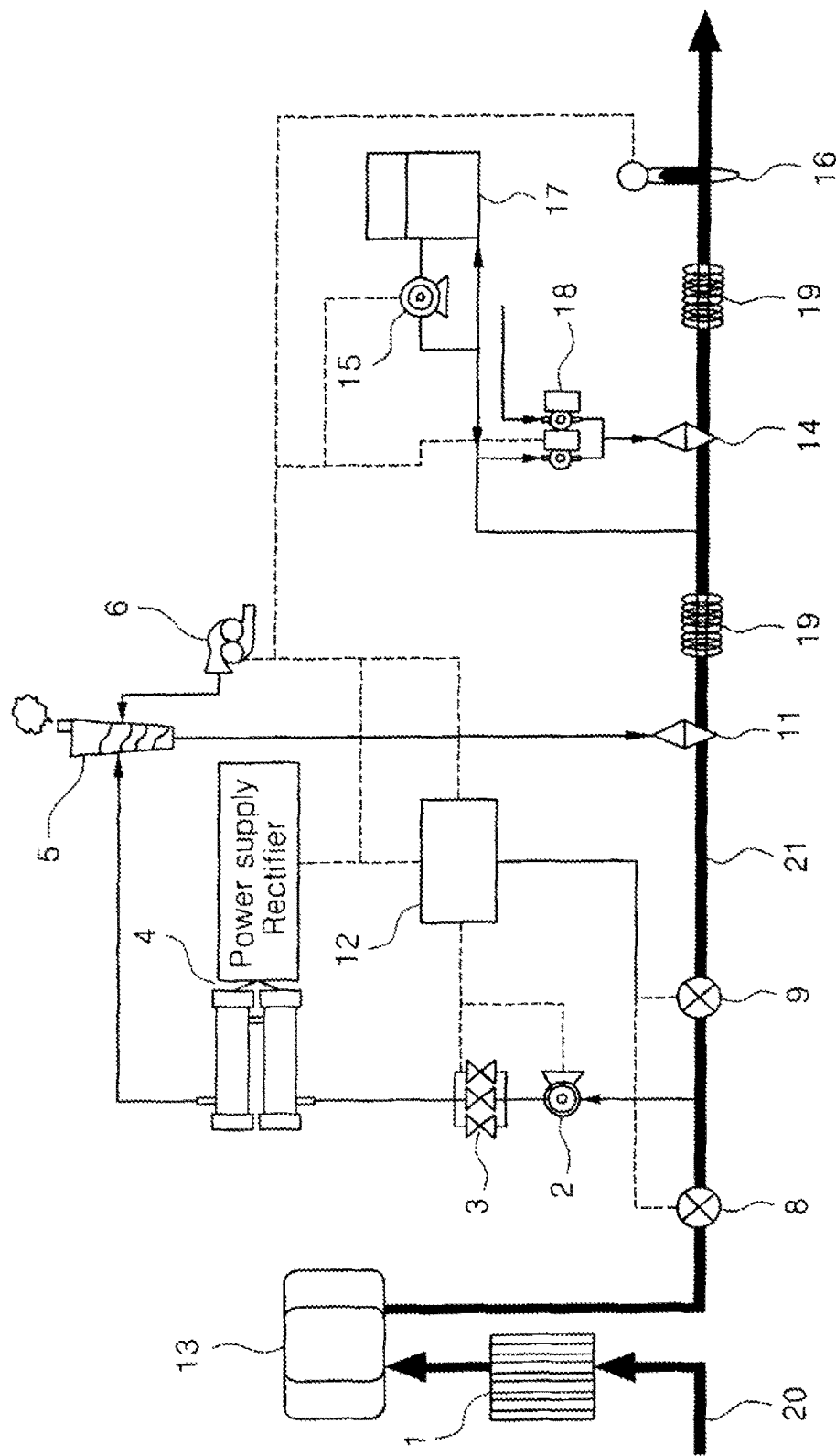
[Fig. 3]

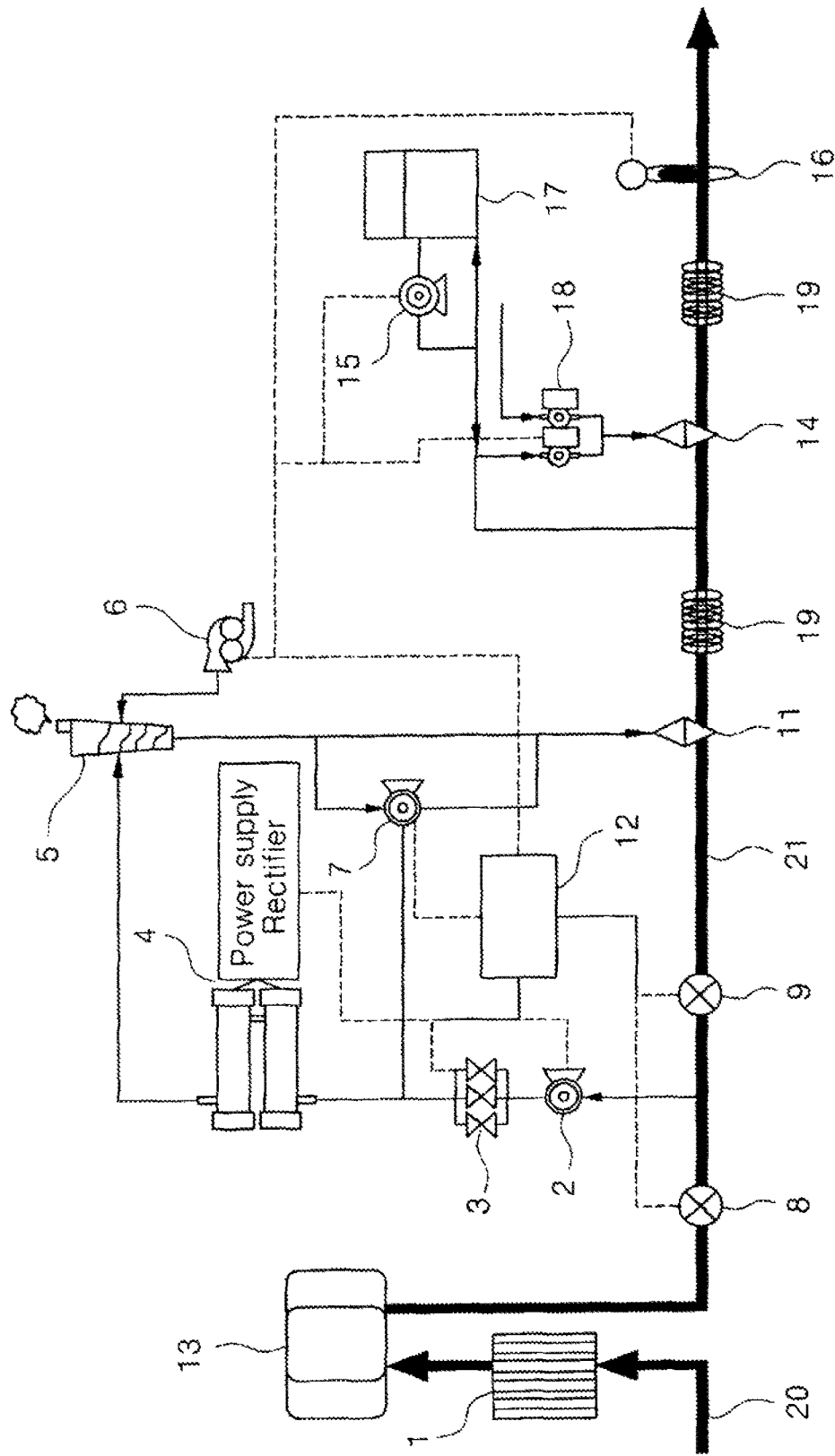
[Fig. 4]

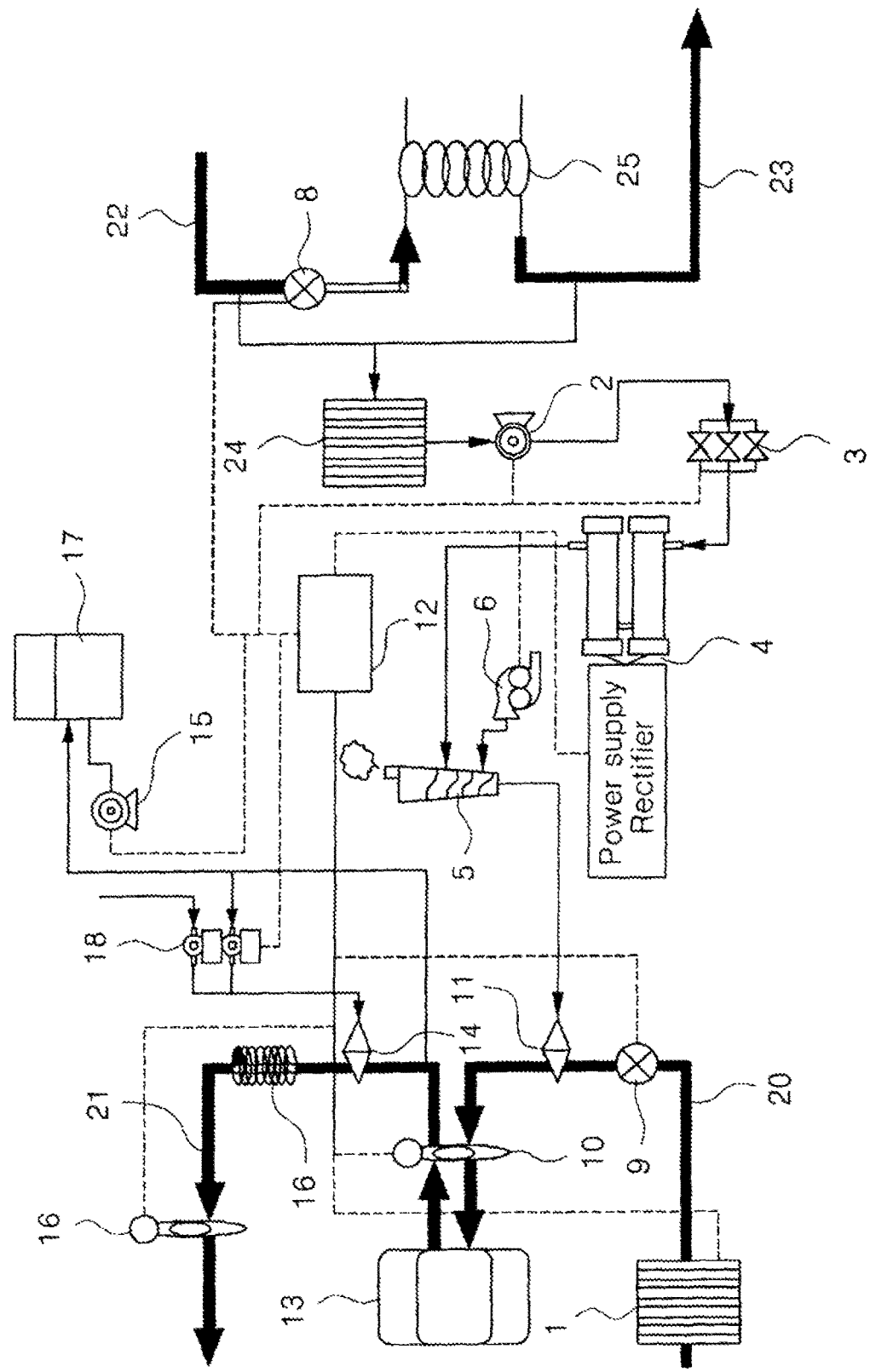
[Fig. 5]

[Fig. 6]
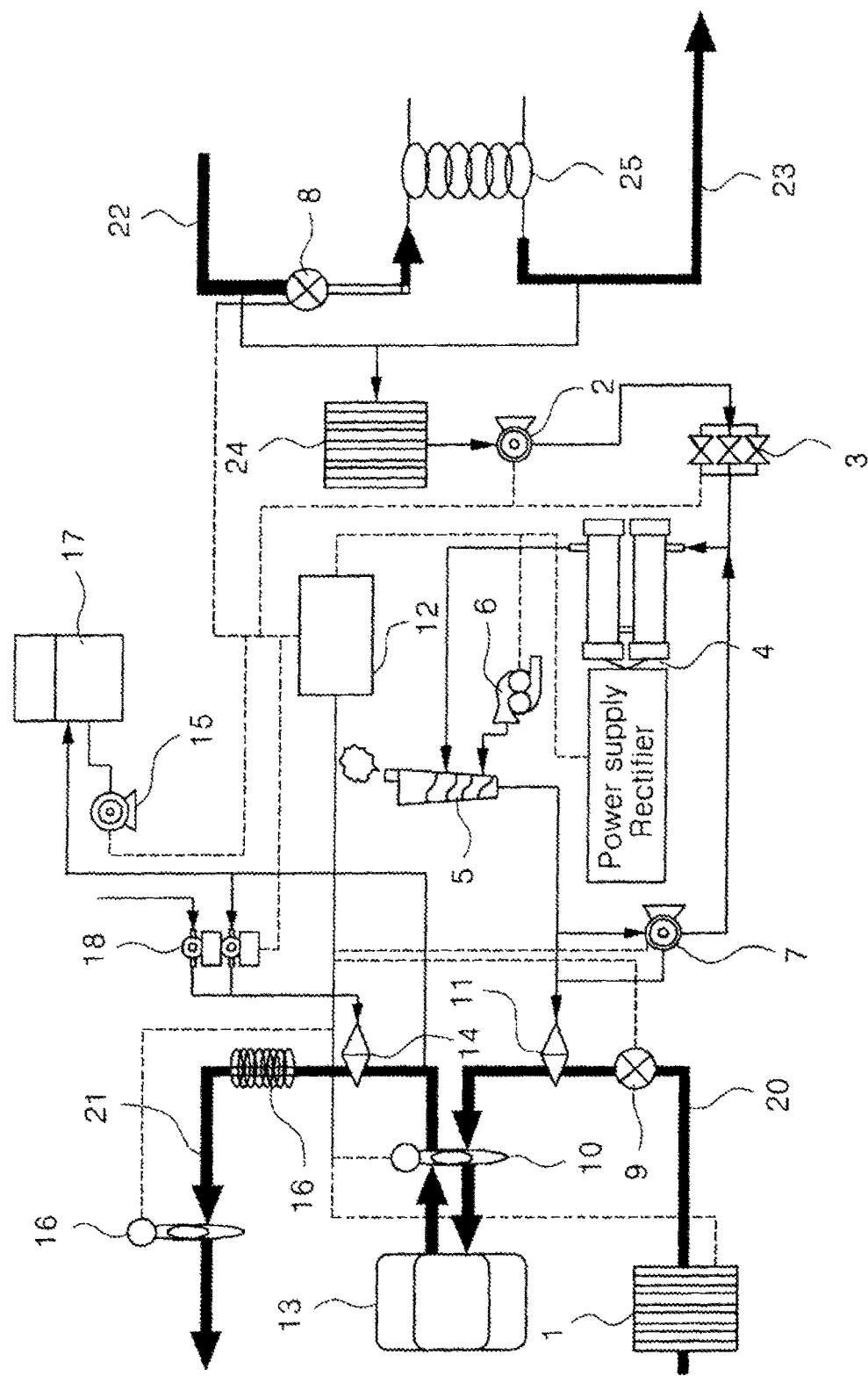

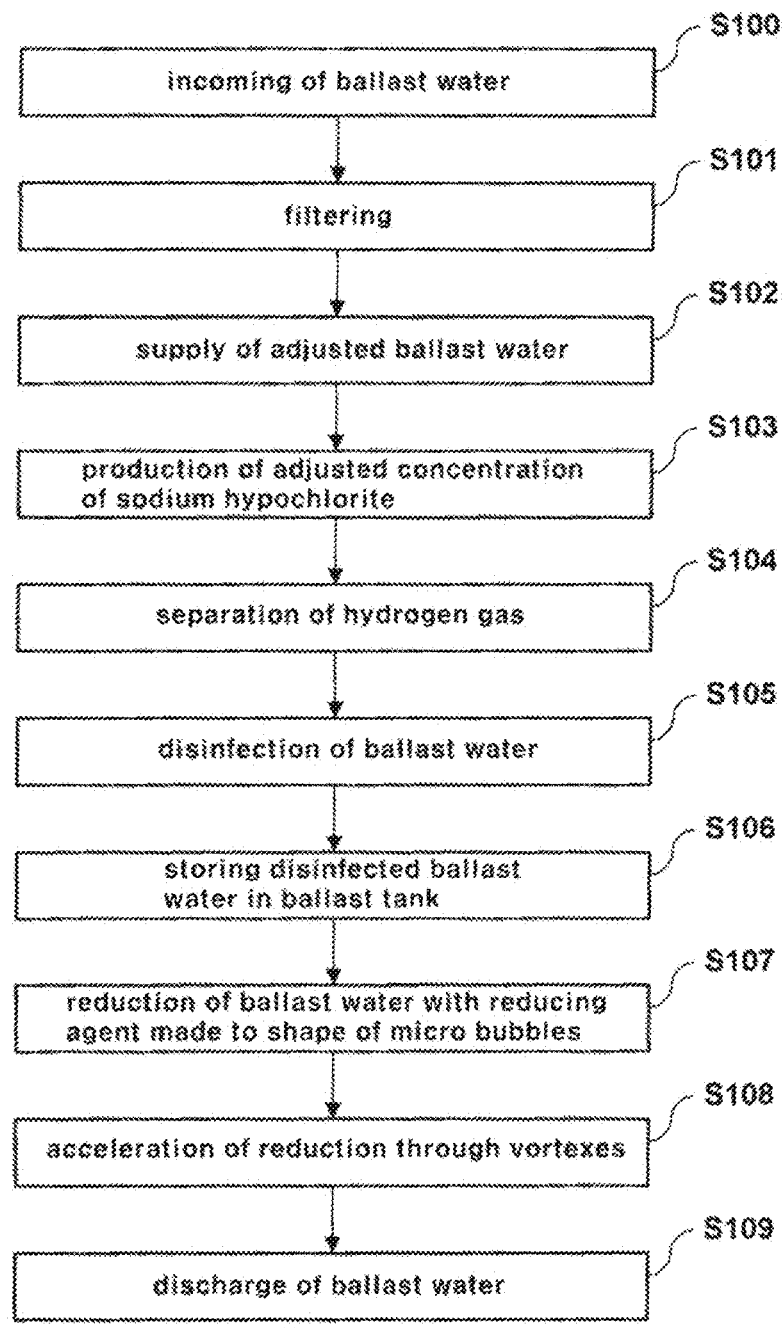
[Fig. 7]

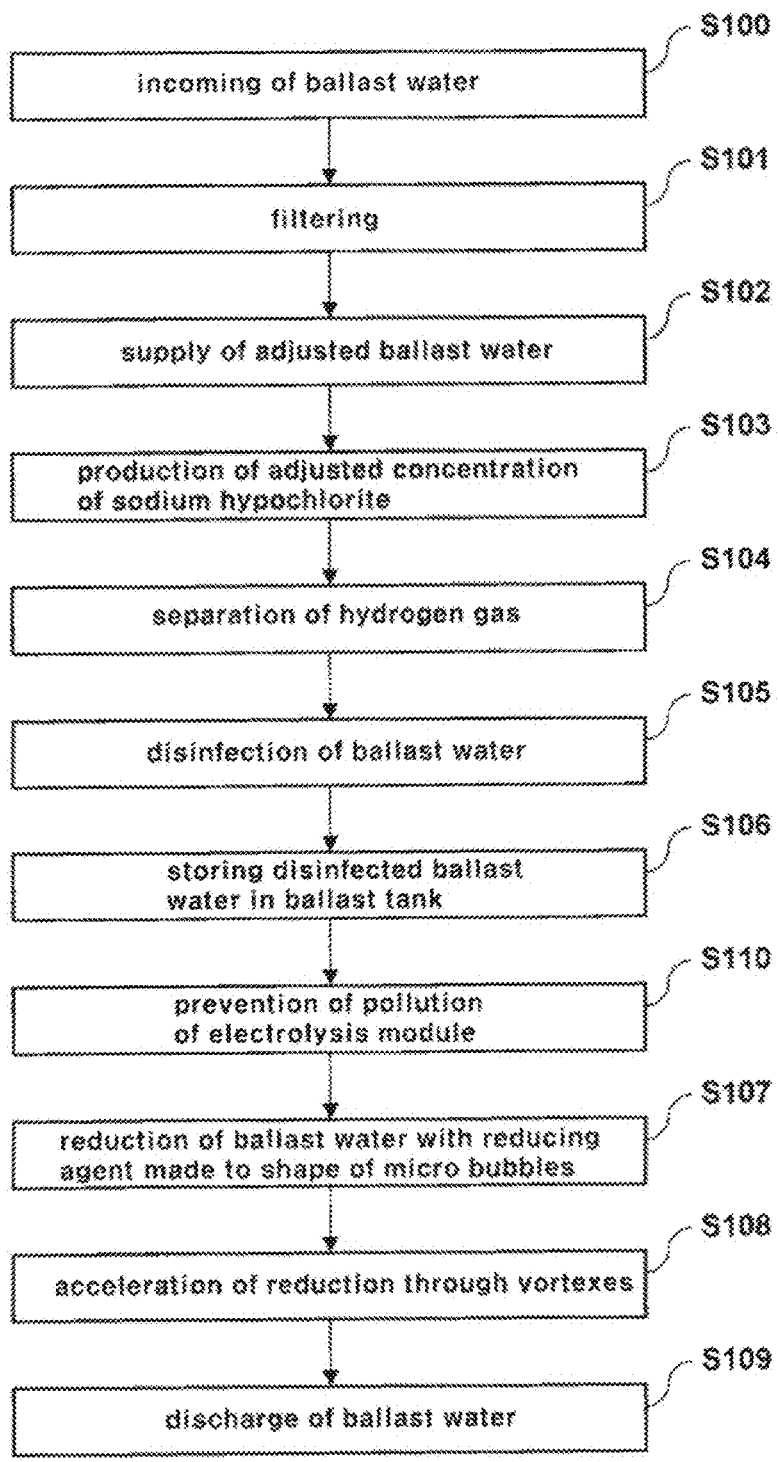

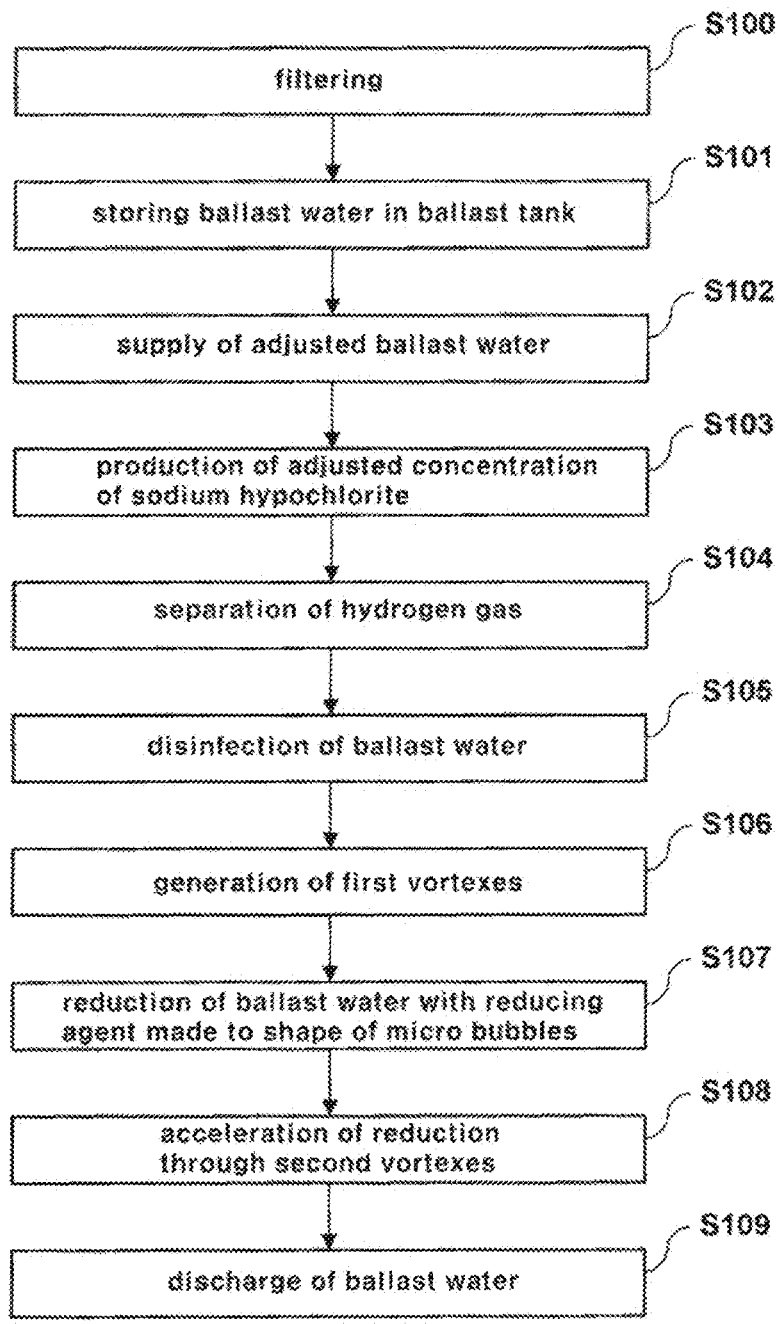

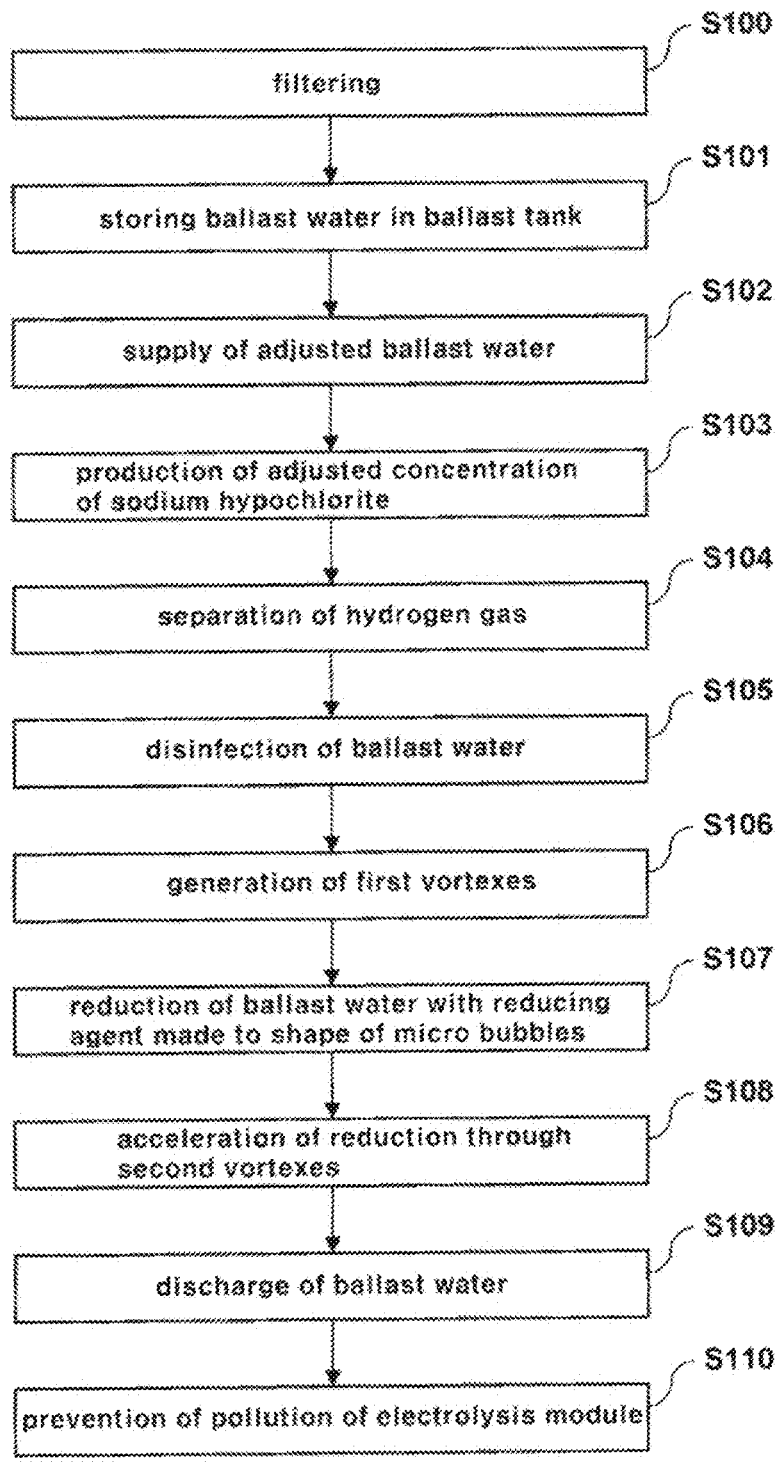
[Fig. 10]

[Fig. 11]
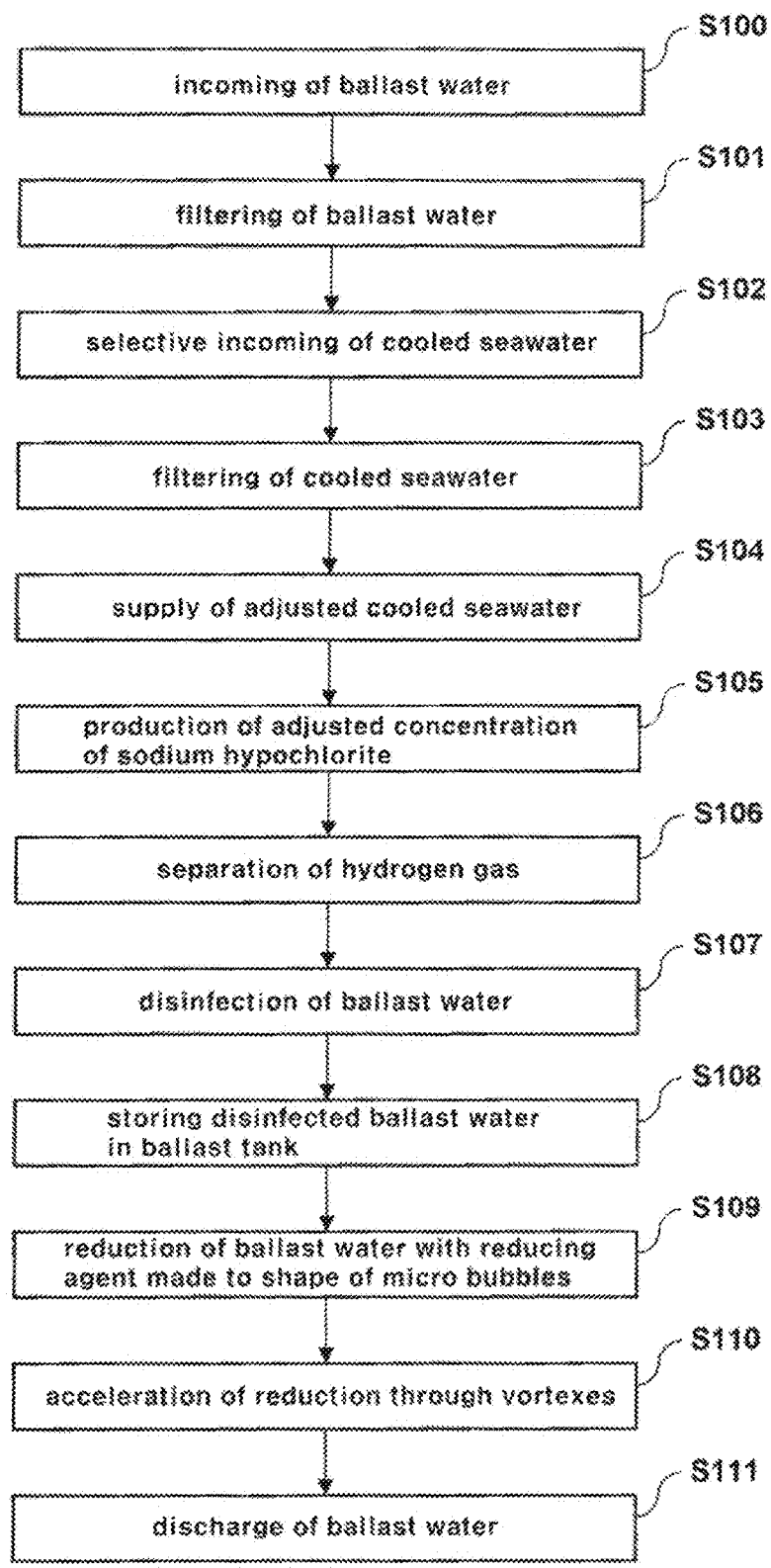

[Fig. 12]
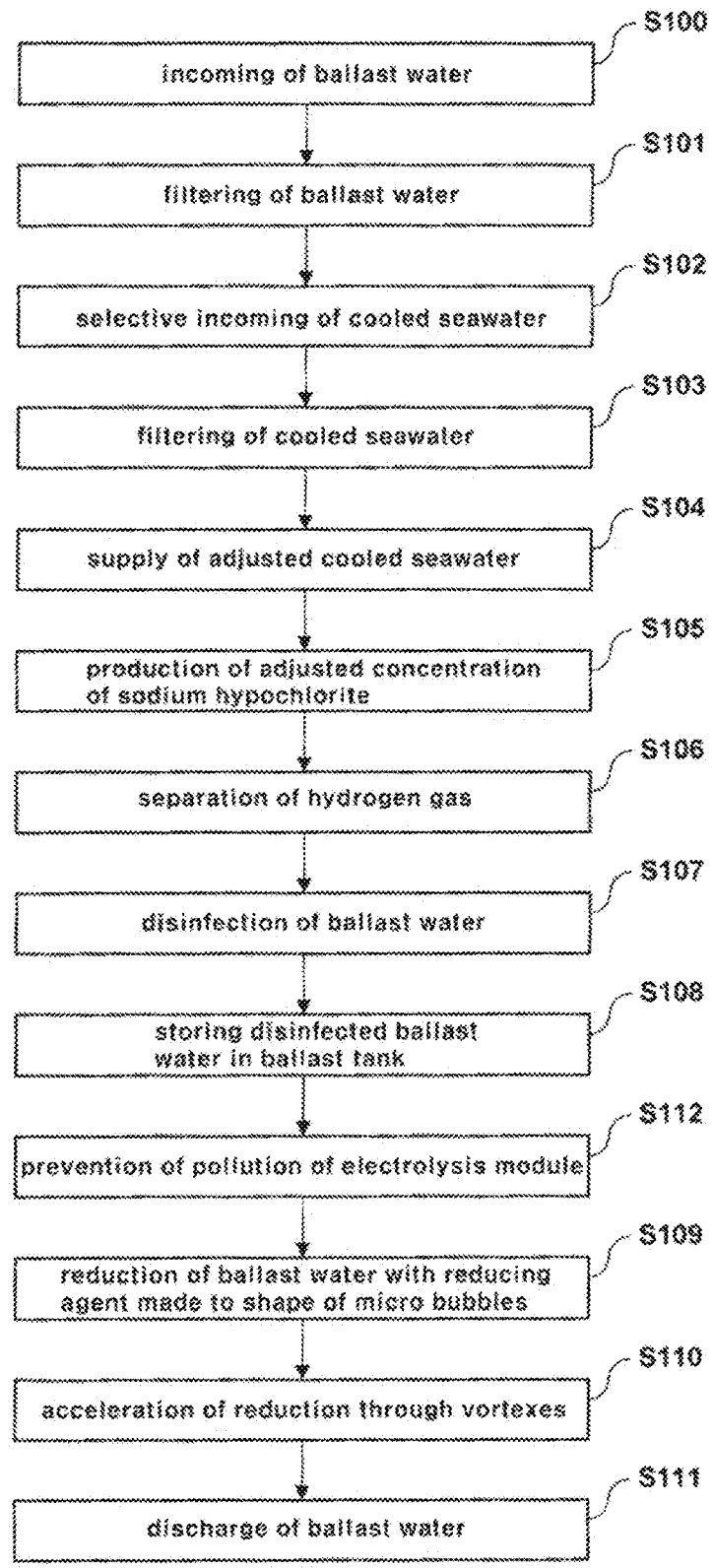

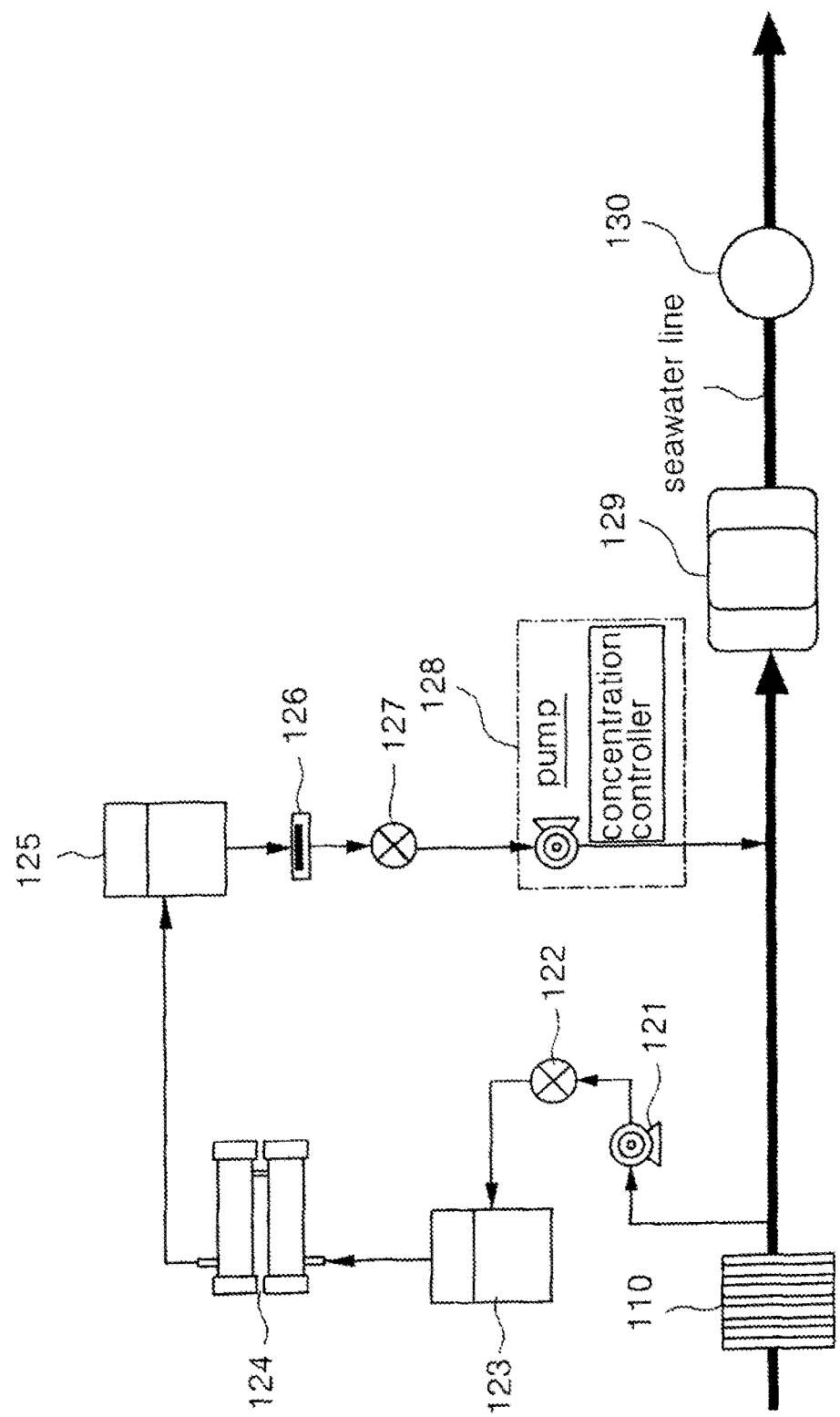
[Fig. 13]

[Fig. 14]
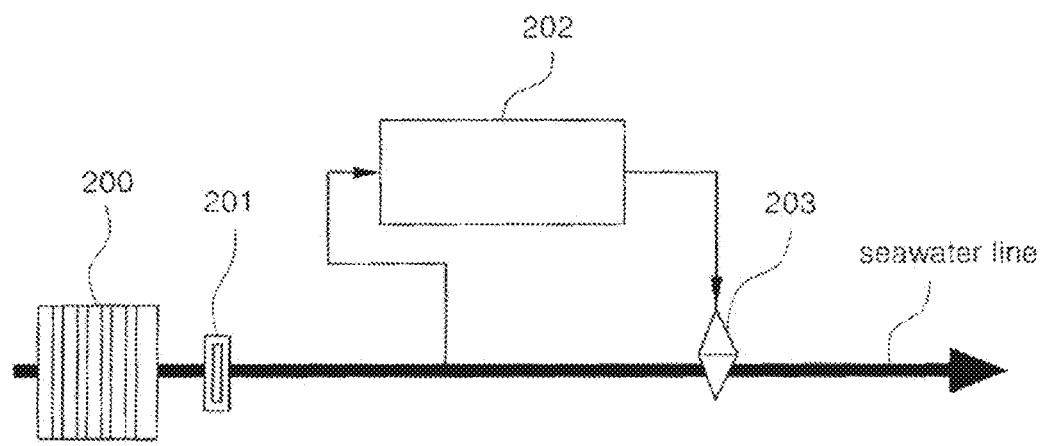
[Fig. 15]
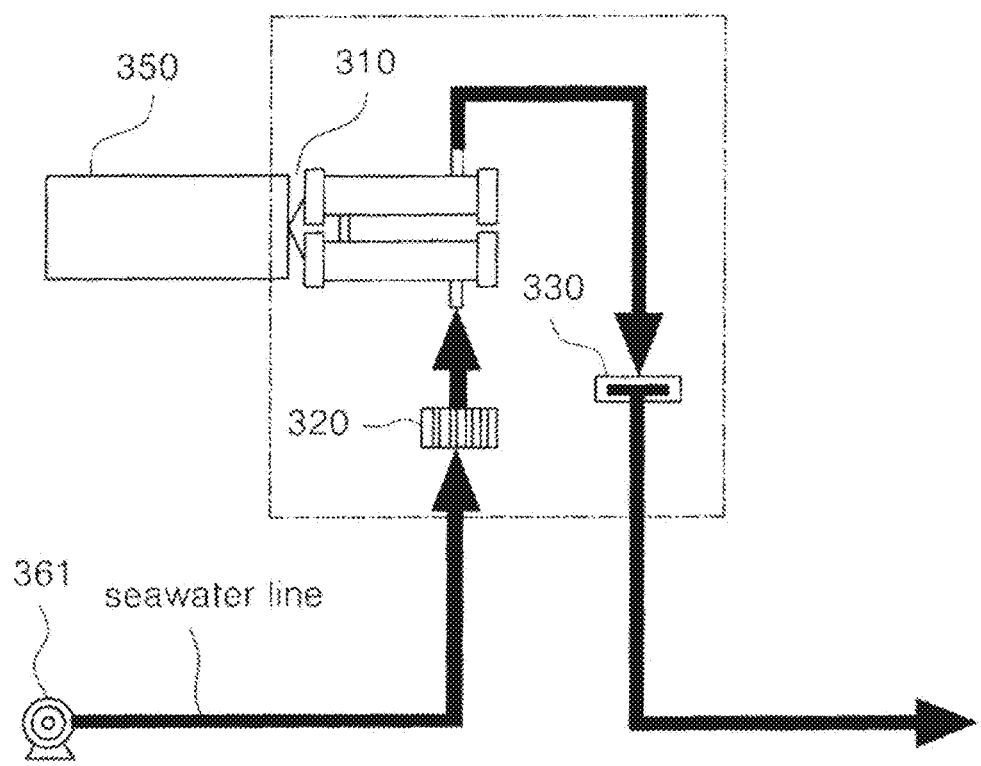

APPARATUS AND METHOD FOR TREATING BALLAST WATER

CROSS-REFERENCE TO RELATED APPLICATION

This application is a division of U.S. patent application Ser. No. 13/055,546, filed on Jan. 28, 2011, which is the National Stage Entry of PCT/KR2009/003756, filed on Jul. 9, 2009, which claims the priority of Korean Patent Application No. 10-2008-0072176, filed on Jul. 24, 2008, which is hereby incorporated by reference in their entireties into this application.

TECHNICAL FIELD

The present invention relates to an apparatus and a method for treating ballast water, and more particularly, to an apparatus and a method for treating ballast water that performs the electrolysis for the seawater from which aquatic organisms, bacteria and general microorganisms are removed at the time of flowing the seawater as the ballast water into a ballast tank during a voyage of a ship, produces a disinfectant through the electrolysis, injects the produced disinfectant into the seawater through precise control to purify the flowing seawater, performs a reducing process for the ballast water discharged from the ballast tank to sea with a reducing agent through precise and reliable control, and discharges the ballast water in a state of harmlessness to the sea.

BACKGROUND ART

In general, ships such as oil tankers, cargo ships and so on carry cargos like oil to an importing country, and after the cargos are unloaded on a port of the importing country, the ship stores an amount of seawater corresponding to the cargos in a ballast tank therein. Storing the seawater in the ship is performed to adjust draft (a depth of a ship submerged into water when the ship floats on the water) and trim (front and back inclination of a ship), so as to previously prevent the balance of the ship during the voyage from being broken by the light weight of the ship after the unloading of the cargos.

In other words, if a ship does not have a predetermined weight, the draft line is lowered to the lower portion of the ship by means of buoyancy, thereby causing some problems that the propeller of the ship is exposed to fail to obtain a propelling force, a wave resistance force during the voyage is lowered to apply much load to the voyage, and the body of the ship is destroyed.

So as to prevent the above-mentioned problems and thus to obtain the balance of the ship, the ballast water is stored in the ballast tank when the cargos do not exist, and the ballast water is discharged from the ballast tank when the cargos are loaded.

Accordingly, the importing country of the cargos becomes the exporting country of the ballast water. On the other hand, the ship in which the ballast water is stored sails to the exporting country of the cargos from the importing country of the cargos and discharges the ballast water to the sea near the exporting country. That is, the exporting country of the cargos becomes the importing country of the ballast water.

By the way, the ballast water typically contains specific toxic microorganisms and bacteria existing in the sea near the exporting country of the ballast water.

When the ballast water containing the microorganisms and bacteria is discharged in the sea near the importing country, marine ecosystems may be broken, so that the international carrying of aquatic organisms by the ballast water has been issued.

Thus, the international convention for the control and management of ships' ballast water and sediments is adopted by 74 attendants in United Kingdom (London) in Feb. 13, 2004. In this convention, when the ballast water is discharged to the sea near the importing country of the ballast water, the standards for the organisms of the ballast water discharged are set. If the standards are not satisfied, the importing country of the ballast water can reject the discharging of the ballast water, that is, the reception of the ballast water. Referring in detail to the standards of the organisms of the ballast water in the convention, discharging for the aquatic organisms having a minimum size of more than 50 μm should be less than 10/1 $m^3$, discharging for the aquatic organisms having a size in a range of 10 μm to 50 μm should be less than 10/1 ml, discharging for the toxic *vibrio cholera* of indicator microorganisms should be less than 1 cfu/100 ml, discharging for the *Escherichia coli* should be less than 250 cfu/100 ml, and discharging for the enterococci should be less than 100 cfu/100 ml (wherein 'cfu' is a unit forming colony).

There have been various methods for purifying the ballast water at the time of storing the ballast water into the ship and at the time of discharging it to sea, and the various methods include direct electrolysis and indirect electrolysis of seawater wherein electrolysis for the seawater is basically performed to produce disinfectants and to treat the ballast water by using the produced disinfectants.

The direct electrolysis of seawater is performed by passing a whole amount of the seawater, that is, ballast water flowing into a ballast tank through an electrobath, thereby continuously disinfecting the ballast water. The direct electrolysis of seawater is classified into direct oxygen electrolysis and direct chlorine electrolysis in accordance with the kinds of disinfectants produced.

The direct oxygen electrolysis has a disinfectant selected from the group consisting of OH*, $O_3$ and $H_2O_2$ and has the usage electrode of BDD. The direct oxygen electrolysis has some advantages in that the installation is simple in configuration, the disinfection speed is high, the residual products after the disinfection are small, and the neutralization of the disinfectant is not needed. To the contrary, it has some disadvantages in that a high quality of filter is required, the cost of the usage electrode is high, the disinfectant do not have any residual property so that the disinfection is needed again at the time of discharging ballast water, the electrobath is easily polluted, a test for the disinfection effects is required, and hydrogen gas is explosive because of the flow of generated hydrogen into the ballast tank.

The direct chlorine electrolysis has a disinfectant selected from the group consisting of NaOCl, OCl⁻ and HOCl and has the usage electrode of DSA. The direct chlorine electrolysis has some advantages in that the installation is simple in configuration, the residual disinfecting effects exist, and a low quality of filter is used. To the contrary, it has some disadvantages in that the control of disinfection is difficult, the disinfection speed is low, the residual products after the disinfection are made, the neutralization of the disinfectant is needed, the electrobath is easily polluted, the hydrogen gas is explosive because of the flow of generated hydrogen into the ballast tank, and the electrolysis efficiency is sensitive to a quality of water.

On the other hand, the indirect electrolysis of seawater is performed by passing a portion of the seawater, that is, ballast water flowing into the ballast tank through an electrobath to produce a disinfectant and by injecting a predetermined amount of disinfectant into the ballast water flowing into the ballast tank. The disinfectant is selected from chlorine disinfectants. In more detail, the disinfectant is selected from the group consisting of NaOCl, OCl⁻ and HOCl, and the usage electrode of DSA is used. The indirect chlorine electrolysis has some advantages in that the control of the disinfection efficiency is easy, the durability of the installation is high, the life term of the plate is long, the residual disinfection effects exist, and the technology is very practical in use. To the contrary, it has some disadvantages in that the disinfection speed is low, the residual products after the disinfection are made, the neutralization of the disinfectant is needed, all of which are common in the direct and indirect chlorine electrolysis, and the injection of a neutralizing agent is needed together with the addition of chemicals in other chemical treatments.

The indirect chlorine electrolysis in the direct and indirect electrolysis of seawater has the properties of the residual disinfection and hydrogen stability, thereby providing higher disinfection control and installation stability when compared with the direct chlorine electrolysis, and further, since it makes use of an amount of seawater corresponding to 1/50 to 1/200 of the seawater of the direct chlorine electrolysis, the load of the electrobath and the installation area become small to allow subsidiary safety equipment to be easily installed, thereby providing most reliable and effective electrolysis results.

Hereinafter, an explanation on the apparatuses for treating ballast water according to conventional practices will be in detail given with reference to FIGS. 13 to 15.

FIG. 13 is a circuit diagram showing a schematic configuration of an apparatus for treating ballast water according to one prior art indirect electrolysis of seawater. As shown, there is provided an apparatus for treating ballast water including: a pre-processor 110 adapted to filter and separate the seawater flowing through an intake line from the sea of the outside of a ship; a pump 121 adapted to flow a portion of the seawater passed through the pre-processor 110 thereinto; a seawater supplier 123 adapted to store the seawater passed through the pump 121 and a flow rate meter 12 therein; a generator 124 adapted to perform electrolysis of the seawater supplied from the seawater supplier 123 to generate sodium hypochlorite; a storing tank 125 adapted to store the sodium hypochlorite generated from the generator 124 therein; a concentration measurer 126 adapted to measure the concentration of the sodium hypochlorite supplied from the storing tank 125; and a sodium hypochlorite supplier 128 adapted to control an amount of supply and concentration of the sodium hypochlorite supplied through the concentration measurer 126 and a flow rate meter 127 and to supply the controlled sodium hypochlorite to a ballast tank 129.

Further, the apparatus for treating ballast water includes an ultraviolet radiator 130 adapted to radiate ultraviolet rays to the ballast water at the time of discharging the ballast water stored in the ballast tank 129.

FIG. 14 is a circuit diagram showing a schematic configuration of an apparatus for treating ballast water according to another prior art indirect electrolysis of seawater. As shown, there is provided an apparatus having a ballast tank disposed between an intake line and a discharge line and a pre-processor 200 adapted to filter and separate the deleterious substances contained in the seawater flowing through the intake line, wherein the apparatus includes: a seawater converter 202 adapted to flow a portion of the seawater through an incoming pipe, to produce sodium hypochlorite therefrom, to pass the produced sodium hypochlorite through a concentration controller, and to inject the sodium hypochlorite into the ballast water through a discharge pipe; a concentration detector 201 adapted to detect the kinds and concentrations of the deleterious substances contained in the seawater passed through the pre-processor 200 and electrically connected to the concentration controller of the seawater converter 202 by means of a controller; and an injection nozzle 203 disposed in the discharge pipe of the seawater converter 202.

FIG. 15 is a circuit diagram showing a schematic configuration of an apparatus for treating ballast water according to still another prior art direct electrolysis of seawater. As shown, there is provided an apparatus for disinfecting ballast water that performs the removal or inactivation of aquatic organisms including bacteria contained in the ballast water for ships, the apparatus including: an inlet port formed at one side of the apparatus so as to flow the ballast water therethrough; an outlet port formed at the other side thereof so as to discharge the ballast water therefrom; a vortex generation baffle 320 disposed in the inlet port side; a residual chlorine concentration-measuring sensor 330 disposed in the outlet port side; an electrolysis module 310 disposed in a chamber disposed between the baffle 320 and the sensor 330 and having a plurality of electrode sets each having a pair of electrodes; a power supply part 350 disposed to the outside of the electrolysis module 310 so as to supply power to the electrolysis module 310; a pump 361 adapted to intake and discharge the ballast water thereinto and therefrom; and connection means composed of pipes and valves connected to the pump 361.

In the conventional methods for treating ballast water, however, the indirect electrolysis of seawater as shown in FIG. 13 does not have any means for precisely controlling an amount of disinfectant to be injected in accordance with a flow rate of the ballast water flowing into the ballast tank, so that the ballast water not treated, that is, the ballast water containing pollution sources may flow into the ballast tank.

Additionally, the prior art apparatus does not have any means for processing hydrogen gas generated after the electrolysis from the generator in which the electrolysis for the seawater is performed to generate the sodium hypochlorite therefrom, so that if the hydrogen gas is accumulated, it may be exploded in the ballast tank.

Further, the ballast tank is generally operated one or two times during the voyage of the ship and is stopped during most of voyage time, so that the seawater stays in the interior of the ballast tank. At this time, the generator generating the sodium hypochlorite may be polluted. However, the prior art apparatuses do not have any means for preventing the generator from being polluted, thereby causing the durability of the apparatus to be lowered.

Referring in detail to the problems appearing in FIG. 13, the prior art apparatus includes: the pump, the flow rate meter and the seawater supplier in which the pumped seawater is stored provided so as to supply a predetermined amount of seawater to the generator like a sodium hypochlorite generator adopted in a field of fresh water like water purifying plants; the storing tank adapted to store the sodium hypochlorite generated from the generator through the reaction with the predetermined flow rate of seawater supplied thereto; and the concentration measurer adapted to measure the concentration of the sodium hypochlorite stored in the storing tank and to keep a predetermined degree of concentration of the sodium hypochlorite. But the flow rate meter and the seawater supplier are not necessarily required. Unlike the fresh water, that is, the seawater generally has a constant concentration (having 1% at the boundary between the fresh water and the seawater and about 3% in general seawater), and accordingly, there is no need for the installation of the flow rate meter measuring the flow rate of the seawater and the seawater supplier storing the seawater temporarily therein.

In the same manner as in the above, there is no need for the installation of the storing tank in which the sodium hypochlorite generated is stored and the concentration measurer for measuring the concentration of the disinfectant. The reason why they are not needed is that the concentration (in a range of 500 ppm to 8000 ppm) of the sodium hypochlorite stored in the storing tank is too high to be measured by means of existing concentration measurers (which can measure 0 ppm to 10 ppm) and is decreased (the concentration thereof in seawater is decreased more speedily than that in fresh water) as time is passed. In this case, the concentration-decreased disinfectant during the idle time after the activation of the equipment is just injected without any additional treatment at the time of activating the equipment again, and even though the measurement for the concentration of the sodium hypochlorite is made by means of the concentration measurer, it is not easy to perform precise control.

Also, there is no means for recognizing a precise amount of seawater flowing at the time of flowing the seawater into the ballast tank by using the concentration controller and the pump constituting the sodium hypochlorite supplier in accordance with the measured concentration of the sodium hypochlorite through the concentration measurer, so that it is not easy to control whether how much sodium hypochlorite stored per the unit flow rate of the seawater flowing is injected. That is, a most important object of the apparatus for treating ballast water is to constantly maintain the chlorine demand (of about 5 ppm to 10 ppm) for disinfecting the ballast water in accordance with the flow rate of the ballast water flowing into the ballast tank, but the apparatus as shown in FIG. 13 does not have such means.

Further, the apparatus as shown in FIG. 13 has the ultraviolet radiator for finally reducing the ballast water discharged from the ballast tank so as to discharge the ballast water into sea, but since the linear velocity of the flow rate of the ballast water discharged from the ship is about 3 m/sec, the staying time is very short. So as to perform a reliable process, therefore, the ultraviolet radiator should have a substantially large capacity, and in order to activate the large-sized ultraviolet radiator, further, a great amount of power should be required, which is very difficult to be practically used.

Moreover, since the process as shown in FIG. 13 is carried out wherein the direct electrolysis for the ballast water flowing into the ballast tank is performed to produce the disinfectant like the sodium hypochlorite, it is very sensitive to the variations of the temperature of the ballast water, and thus, if the temperature of the ballast water is low, the electrolysis efficiency of the ballast water is drastically lowered.

The indirect electrolysis of seawater as shown in FIG. 14 does not have any means for precisely controlling an amount of disinfectant to be injected in accordance with a flow rate of the ballast water flowing into the ballast tank, so that the ballast water not treated, that is, the ballast water containing pollution sources may flow into the ballast tank.

Additionally, the prior art apparatus does not have any means for processing hydrogen gas generated after the electrolysis from the seawater converter in which the electrolysis for the seawater is performed to generate the sodium hypochlorite therefrom, so that if the hydrogen gas is accumulated, it may be exploded in the ballast tank.

Further, the ballast tank is generally operated one or two times during the voyage of the ship and is stopped during most of voyage time, so that the seawater stays in the interior of the ballast tank. At this time, the seawater converter generating the sodium hypochlorite may be polluted. However, the prior art process does not have any means for preventing the seawater converter from being polluted, thereby causing the durability of the apparatus to be lowered.

Moreover, since the process as shown in FIG. 14 is carried out wherein the direct electrolysis for the ballast water flowing into the ballast tank is performed to produce the disinfectant like the sodium hypochlorite, it is very sensitive to the variations of the temperature of the ballast water, and thus, if the temperature of the ballast water is low, the electrolysis efficiency of the ballast water is drastically lowered.

The direct electrolysis of seawater as shown in FIG. 15 does not have any means for precisely controlling an amount of disinfectant to be injected in accordance with a flow rate of the ballast water flowing into the ballast tank, so that the ballast water not treated, that is, the ballast water containing pollution sources may flow into the ballast tank.

Additionally, the prior art apparatus does not have any means for processing hydrogen gas generated after the electrolysis from the electrolysis module in which the electrolysis for the seawater is performed to generate the sodium hypochlorite therefrom, so that if the hydrogen gas is accumulated, it may be exploded in the ballast tank.

Further, since the seawater is not passed through any specific pre-processor, fouling occurs by the sludge in the seawater, thereby decreasing the electrolysis efficiency and producing the ballast water not treated.

Further, the ballast tank is generally operated one or two times during the voyage of the ship and is stopped during most of voyage time, so that the seawater stays in the interior of the ballast tank. At this time, the electrolysis module generating the sodium hypochlorite may be polluted. However, the prior art process does not have any means for preventing the electrolysis module from being polluted, thereby causing the durability of the apparatus to be lowered.

Also, generally, the electrolysis (Faraday) efficiencies are varied in accordance with the concentrations of seawater in the same conditions, and the electrolysis module normally operating in the general concentration of NaCl of 2.5% to 3% in the seawater shows a drastically decreased electrolysis efficiency at the concentration of 2.5% or less. In case of the direct disinfection wherein the electrolysis for the whole amount of ballast water is performed, accordingly, there is no means for preventing the decrease of the electrolysis efficiency, so that the treatment efficiency is determined by the concentration of the seawater, thereby disadvantageously generating the ballast water not treated.

Moreover, since the process as shown in FIG. 15 is carried out wherein the direct electrolysis for the ballast water flowing into the ballast tank is performed to produce the disinfectant like the sodium hypochlorite, it is very sensitive to the variations of the temperature of the ballast water, and thus, if the temperature of the ballast water is low, the electrolysis efficiency of the ballast water is drastically lowered.

DISCLOSURE

Technical Problem

Accordingly, the present invention has been made in view of the above-mentioned problems occurring in the prior art, and it is an object of the present invention to provide an apparatus and a method for treating ballast water that produces sodium hypochlorite continuously in accordance with the flow rates of the ballast water flowing to a ballast tank or discharged from the ballast tank to supply the produced sodium hypochlorite to seawater lines, thereby removing the variations of the concentration of the sodium hypochlorite caused by the storing of the sodium hypochlorite, and performs a reducing process for the ballast water discharged through the ballast tank to sea by means of the injection of a reducing agent to allow the ballast water to be discharged in a state of harmlessness, thereby basically preventing the sea pollution.

It is another object of the present invention to provide an apparatus and a method for treating ballast water that precisely controls the production of a disinfectant through electrolysis and the injection amount of the disinfectant in accordance with the flow rates of the ballast water flowing to a ballast tank or discharged from the ballast tank, thereby managing the ballast water of a ship to prevent marine ecosystems from being destructed or disturbed.

It is still another object of the present invention to provide an apparatus and a method for treating ballast water that removes the hydrogen gas generated after the electrolysis in an electrolysis module where the electrolysis for seawater is carried out to generate sodium hypochlorite therefrom, thereby avoiding the explosion in a ballast tank.

It is yet another object of the present invention to provide an apparatus and a method for treating ballast water that circulates seawater periodically or continuously and prevents pollution sources from sticking to an electrolysis module during the activation of the electrolysis module generating sodium hypochlorite stops, thereby ensuring the stability of the equipment and increasing the durability thereof.

It is yet still another object of the present invention to provide an apparatus and a method for treating ballast water that controls the flow rate of the ballast water or cooled seawater used as a raw material of sodium hypochlorite and constantly maintains the current efficiency of an electrolysis module, thereby preventing the treatment efficiency from being lowered in accordance with salt contents different by port and providing the reliability.

It is still another object of the present invention to provide an apparatus and a method for treating ballast water that makes use of cooled seawater as raw water flowing along a cooling water system to supply the cooled seawater to an electrolysis module where sodium hypochlorite is generated, so that the seawater having a predetermined temperature or more is supplied, thereby enhancing the electrolysis efficiency.

Technical Solution

To accomplish the above objects, according to a first aspect of the present invention, there is provided an apparatus for treating ballast water wherein a portion of the ballast water flowing from a seawater intake line is controlled at a flow rate thereof under the control of a control system and supplied to an electrolysis module in which sodium hypochlorite having an adjusted concentration is produced; wherein after hydrogen gas produced at the time of producing the sodium hypochlorite is removed through a gas-liquid separator, the sodium hypochlorite is supplied to the seawater intake line flowing into a ballast tank in accordance with an amount of residual chlorine in the ballast water, the ballast water is disinfected with the sodium hypochlorite, and the disinfected ballast water is stored in the ballast tank; and wherein an amount of reducing agent to be injected is controlled under the control of the control system in accordance with the amounts of residual chlorine of the ballast water, the controlled amount of reducing agent is supplied to a seawater discharge line, a neutralizing process for the ballast water is carried out to obtain a desired amount of residual chlorine, and the neutralized ballast water is discharged to sea.

To accomplish the above objects, according to a second aspect of the present invention, there is provided an apparatus for treating ballast water wherein a portion of the ballast water flowing from a seawater discharge line passed through a ballast tank is controlled at a flow rate thereof under the control of a control system and supplied to an electrolysis module in which sodium hypochlorite having an adjusted concentration is produced; wherein after hydrogen gas produced at the time of producing the sodium hypochlorite is removed through a gas-liquid separator, the sodium hypochlorite is supplied to the seawater discharge line in accordance with an amount of residual chlorine in the ballast water, and the ballast water is disinfected with the sodium hypochlorite; and wherein an amount of reducing agent to be injected is controlled under the control of the control system in accordance with the amounts of residual chlorine of the ballast water, the controlled amount of reducing agent is supplied, a neutralizing process for the ballast water is carried out to obtain a desired amount of residual chlorine, and the neutralized ballast water is discharged to sea.

To accomplish the above objects, according to a third aspect of the present invention, there is provided an apparatus for treating ballast water wherein cooled seawater flowing selectively from a cooling seawater line before heat exchange and from a cooling seawater line after heat exchange passed through a heat exchanger is controlled at a flow rate thereof under the control of a control system and supplied to an electrolysis module in which sodium hypochlorite having an adjusted concentration is produced; wherein after hydrogen gas produced at the time of producing the sodium hypochlorite is removed through a gas-liquid separator, the sodium hypochlorite is supplied to a seawater intake line in accordance with an amount of residual chlorine in the ballast water, the ballast water is disinfected with the sodium hypochlorite, and the disinfected ballast water is stored in a ballast tank; and wherein an amount of reducing agent to be injected is controlled under the control of the control system in accordance with the amounts of residual chlorine of the ballast water, the controlled amount of reducing agent is supplied, a neutralizing process for the ballast water is carried out to obtain a desired amount of residual chlorine, and the neutralized ballast water is discharged to sea.

According to the present invention, preferably, the ballast water or the cooled seawater flowing into the electrolysis module is passed through a pre-processing filter for filtering aquatic microorganisms.

According to the present invention, preferably, after passing through the pre-processing filter, the ballast water or the cooled seawater is controlled at the flow rate thereof by means of a seawater supply pump controlled under the control of the control system.

According to the present invention, preferably, after passing through the pre-processing filter, the ballast water or the cooled seawater is controlled at the flow rate thereof by means of flow rate control valves controlled under the control of the control system.

According to the present invention, preferably, after passing through the pre-processing filter, the ballast water or the cooled seawater is controlled at the flow rate thereof by means of a seawater supply pump controlled under the control of the control system, and the ballast water or the cooled seawater supplied from the seawater supply pump is controlled at the flow rate thereof by means of flow rate control valves controlled under the control of the control system.

According to the present invention, preferably, the sodium hypochlorite used for disinfection is supplied by means of an automatic injector by using the variation of the pressure of the ballast water or the cooled seawater, without having separate power.

According to the present invention, preferably, the seawater intake line along which the ballast water flowing into the ballast tank flows has a salinometer, a flow rate meter, and a residual chlorine measurer mounted thereon, the salinometer being adapted to measure the sodium chloride (NaCl) of the ballast water flowing into the ballast tank, the flow rate meter being adapted to measure the flow rate of the ballast water flowing into the ballast tank, and the residual chlorine meter being adapted to measure an amount of residual chlorine of the ballast water into which the sodium hypochlorite is injected.

According to the present invention, preferably, the seawater discharge line along which the ballast water passed through the ballast tank flows has a salinometer, a flow rate meter, and a residual chlorine measurer mounted thereon, the salinometer being adapted to measure the sodium chloride (NaCl) of the ballast water, the flow rate meter being adapted to measure the flow rate of the ballast water, and the residual chlorine meter being adapted to measure an amount of residual chlorine of the ballast water into which the sodium hypochlorite is injected.

According to the present invention, preferably, the cooling seawater line before heat exchange has a salinometer mounted thereon, the salinometer being adapted to measure the sodium chloride (NaCl) of the cooled seawater flowing into the heat exchanger, and the seawater intake line has a flow rate meter and a residual chlorine measurer mounted thereon, the flow rate meter being adapted to measure the flow rate of the ballast water flowing into the ballast tank and the residual chlorine meter being adapted to measure an amount of residual chlorine of the ballast water into which the sodium hypochlorite is injected.

According to the present invention, preferably, the reducing agent injected at the time of discharging the ballast water is supplied by means of an injection nozzle, and the reducing agent and the ballast water are mixed to form micro bubbles and supplied to the injection nozzle by means of a micro bubble generator, while the residual chlorine in the ballast water is being removed.

According to the present invention, preferably, the reducing agent injected at the time of discharging the ballast water is supplied by means of an injection pump and a reducing agent-storing tank, the injection pump being adapted to adjust a flow rate of reducing agent supplied to a micro bubble generator and supply the adjusted flow rate of reducing agent under the control of the control system, and the reducing agent-storing tank being adapted to store the reducing agent to be supplied to the injection pump therein.

According to the present invention, preferably, the reducing agent injected at the time of discharging the ballast water is mixed with the ballast water by means of one or more vortex generators adapted to generate vortexes in the ballast water.

According to the present invention, preferably, the seawater discharge line has a residual chlorine measurer mounted thereon so as to measure a total amount of residual chlorine of the ballast water finally discharged.

According to the present invention, preferably, the control system receives the information from a salinometer, a flow rate meter and a residual chlorine measurer and controls a seawater supply pump, flow rate control valves and the electrolysis module under the received information, so as to inject only a desired amount of sodium hypochlorite into the ballast water flowing into the ballast tank; and the control system receives the information from the residual chlorine measurer to determine an amount of reducing agent and the information from a residual chlorine measurer measuring a degree of harmlessness of the ballast water and controls a micro bubble generator and an injection pump under the received information, so as to inject the reducing agent neutralizing the sodium hypochlorite into the ballast water discharged to the sea and to have only a desired amount of residual chlorine in the ballast water.

According to the present invention, preferably, the control system receives the information from a salinometer and a flow rate meter and controls a seawater supply pump, flow rate control valves and the electrolysis module under the received information, so as to inject only a desired amount of sodium hypochlorite into the ballast water discharged after passed through the ballast tank; and the control system receives the information from a residual chlorine measurer and controls a micro bubble generator and an injection pump under the received information, so as to inject the reducing agent neutralizing the sodium hypochlorite into the ballast water discharged to the sea and to have only a desired amount of residual chlorine in the ballast water.

According to the present invention, preferably, the apparatus further includes a cleaning/injection pump disposed in the line branched from the sodium hypochlorite supply line passed through the gas-liquid separator to the electrolysis module, so as to continuously or periodically circulate the sodium hypochlorite to the electrolysis module in which the production of the sodium hypochlorite stops.

According to the present invention, preferably, the seawater supply pump adjusts the flow rate of the ballast water or the cooled seawater in accordance with the variations of the amount of current supplied under the control of the control system.

According to the present invention, preferably, the flow rate control valves include a plurality of flow control valves adapted to be selectively opened and closed to adjust the flow rate of the ballast water or cooled seawater supplied thereto under the control of the control system.

According to the present invention, preferably, at the time of producing the sodium hypochlorite from the ballast water or the cooled seawater, the electrolysis module adjusts the concentration and production amount of the sodium hypochlorite, while the amount of current supplied to a power supply rectifier is controlled within a rated range, by the under of the control system.

According to the present invention, preferably, the electrolysis module adjusts the concentration of the sodium hypochlorite, so as to satisfy a desired chlorine demand in a range of 2 ppm to 10 ppm.

According to the present invention, preferably, the gas-liquid separator further includes a blower adapted to supply outside air thereto so as to allow the separated hydrogen gas to be diluted.

According to the present invention, preferably, the reducing agent is one selected from sulfite reducing agents such as sulfite, thiosulfate, sulfite plus idodide, dithionite, and calcium sulfite, or one selected from ascorbic acid, hydroxylamine, and PAO.

According to the present invention, preferably, the vortex generator is disposed in the interior of the pipe of the seawater discharge line and includes a plurality of screws having rotary blades.

According to the present invention, preferably, the desired amount of residual chlorine in the ballast water or the cooled seawater discharged to the sea is in a range of 0.5 ppm to 2 ppm.

According to the present invention, preferably, the injection pump is adapted to inject a predetermined amount of reducing agent and controls the flow rate of the reducing agent (with chemical equivalent of the ratio of 1 to 1) under the control of the control system in accordance with the values of the total concentration of the residual chlorine measured by the residual chlorine measurer disposed at the ballast tank side, at the time of discharging the ballast water.

According to the present invention, preferably, during the idle time in the supply of the reducing agent, the injection pump is adapted to circulate the reducing agent-storing tank periodically, thereby preventing salt precipitation from occurring.

To accomplish the above objects, according to a fourth aspect of the present invention, there is provided an apparatus for treating ballast water, including: a pre-processing filter adapted to filter aquatic microorganisms from the ballast water flowing thereinto; a seawater supply pump adapted to adjust a flow rate of the ballast water supplied from the pre-processing filter under the control of a control system and to supply the adjusted flow rate of ballast water to an electrolysis module; flow rate control valves adapted to adjust a flow rate of the ballast water supplied from the seawater supply pump under the control of the control system and to supply the adjusted flow rate of ballast water to the electrolysis module; the electrolysis module adapted to adjust a concentration of sodium hypochlorite and to produce the concentration-adjusted sodium hypochlorite with an amount of current supply controlled under the control of the control system at the time of producing the sodium hypochlorite from the ballast water supplied from the flow rate control valves; a gas-liquid separator adapted to separate hydrogen gas generated as residual products during the production of the sodium hypochlorite in the electrolysis module from the ballast water; a blower adapted to supply outside air to the gas-liquid separator and to dilute the separated hydrogen gas; an automatic injector adapted to supply the sodium hypochlorite from which the hydrogen gas is removed through the gas-liquid separator to a seawater intake line connected to a ballast tank; a salinometer adapted to measure the sodium chloride (NaCl) of the ballast water flowing into the ballast tank through the seawater intake line; a flow rate meter adapted to measure the flow rate of the ballast water flowing into the ballast tank through the seawater intake line; a residual chlorine meter disposed in the seawater intake line and a seawater discharge line at the front and back of the ballast tank and adapted to measure an amount of residual chlorine of the ballast water into which the sodium hypochlorite is injected; an injection nozzle adapted to inject a reducing agent neutralizing the residual chlorine in the ballast water passed through the seawater discharge line at the time of discharging the ballast water stored in the ballast tank to sea; a micro bubble generator adapted to mix the reducing agent and the ballast water branched from the seawater discharge line to form micro bubbles and to supply the micro bubbles to the injection nozzle, while removing the residual chlorine; an injection pump adapted to adjust a flow rate of the reducing agent supplied from the micro bubble generator under the control of the control system and to supply the adjusted flow rate of the reducing agent; a reducing agent-storing tank adapted to store the reducing agent to be discharged by means of the injection pump therein; a vortex generator disposed in the seawater discharge line at the rear end of the injection nozzle to generate vortexes helping the neutralizing reaction of the reducing agent; a residual chlorine measurer disposed in the seawater discharge line at the rear end of the vortex generator to measure a total amount of residual chlorine of the ballast water finally discharged and to measure a degree of harmlessness of the ballast water; the control system adapted to receive the information from the salinometer, the flow rate meter and the residual chlorine measurer and to control the seawater supply pump, the flow rate control valves and the electrolysis module under the received information, so as to inject only a desired amount of sodium hypochlorite into the ballast water flowing into the ballast tank, and adapted to receive the information from the residual chlorine measurer to determine an amount of reducing agent and the information from the residual chlorine measurer measuring a degree of harmlessness of the ballast water and to control the micro bubble generator and the injection pump under the received information, so as to inject the reducing agent neutralizing the sodium hypochlorite into the ballast water discharged to the sea and to have only a desired amount of residual chlorine in the ballast water; and a cleaning/injection pump connected at one side thereof to the line branched from the sodium hypochlorite supply line between the gas-liquid separator and the automatic injector and connected at the other side thereof to the line branched between the flow rate control valves and the electrolysis module, so as to continuously or periodically circulate the sodium hypochlorite passed through the gas-liquid separator to the electrolysis module in which the production of the sodium hypochlorite stops.

To accomplish the above objects, according to a fifth aspect of the present invention, there is provided a method for treating ballast water, including the steps of: allowing the ballast water to flow; filtering aquatic microorganisms from the flowing ballast water; adjusting a flow rate of the ballast water so as to correspond to a desired amount of residual chlorine by means of a seawater supply pump and flow rate control valves under the control of a control system and supplying the adjusted flow rate of ballast water to an electrolysis module; adjusting a concentration of sodium hypochlorite in the ballast water supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the ballast water is sent; separating hydrogen gas contained in the sodium hypochlorite produced in the electrolysis module; supplying the sodium hypochlorite from which the hydrogen gas is removed to the ballast water flowing into a ballast tank and disinfecting the ballast water; storing the disinfected ballast water in the ballast tank; controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of a ship; generating vortexes in the ballast water to which the reducing agent is mixed to allow the reducing process for the ballast water to be accelerated; and discharging the ballast water to sea.

According to the present invention, preferably, the method for treating ballast water further includes the step of continuously or intermittently circulating a predetermined amount of ballast water to the electrolysis module whose activation stops and preventing the pollution of the electrolysis module, after the step of storing the disinfected ballast water in the ballast tank.

To accomplish the above objects, according to a sixth aspect of the present invention, there is provided a method for treating ballast water, including the steps of: filtering aquatic microorganisms from the ballast water flowing; storing the ballast water from which the deleterious substances are removed into a ballast tank; adjusting a flow rate of the ballast water so as to correspond to a desired amount of residual chlorine by means of a seawater supply pump and flow rate control valves under the control of a control system and supplying the adjusted flow rate of ballast water to an electrolysis module; adjusting a concentration of sodium hypochlorite in the ballast water supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the ballast water is sent; separating hydrogen gas contained in the sodium hypochlorite produced in the electrolysis module; supplying the sodium hypochlorite from which the hydrogen gas is removed to the ballast water flowing along a seawater discharge line discharged to the outside of a ship into a ballast tank and disinfecting the ballast water; firstly generating vortexes in the ballast water having the sodium hypochlorite residual therein; controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of the ship; secondarily generating vortexes in the ballast water to which the reducing agent is mixed to allow the reducing process for the ballast water to be accelerated; and discharging the ballast water to sea.

According to the present invention, preferably, the method for treating ballast water further includes the step of continuously or intermittently circulating a predetermined amount of ballast water to the electrolysis module whose activation stops and preventing the pollution of the electrolysis module, after the step of discharging the ballast water to sea.

To accomplish the above objects, according to a seventh aspect of the present invention, there is provided a method for treating ballast water, including the steps of: allowing the ballast water to flow; filtering aquatic microorganisms from the flowing ballast water; selectively allowing cooled seawater from a cooling seawater line before heat exchange and from a cooling seawater line after heat exchange to flow; filtering aquatic microorganisms from the cooled seawater flowing; adjusting a flow rate of the cooled seawater so as to correspond to a desired amount of residual chlorine by means of a seawater supply pump and flow rate control valves under the control of a control system and supplying the adjusted flow rate of cooled seawater to an electrolysis module; adjusting a concentration of sodium hypochlorite in the cooled seawater supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the cooled seawater is sent; separating hydrogen gas contained in the sodium hypochlorite produced in the electrolysis module; supplying the sodium hypochlorite from which the hydrogen gas is removed to the ballast water flowing into a ballast tank and disinfecting the ballast water (at a step S107); storing the disinfected ballast water in the ballast tank (at a step S108); controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of a ship; generating vortexes in the ballast water to which the reducing agent is mixed to allow the reducing process for the ballast water to be accelerated; and discharging the ballast water to sea.

According to the present invention, preferably, the method for treating ballast water further includes the step of continuously or intermittently circulating a predetermined amount of cooled seawater to the electrolysis module whose activation stops and preventing the pollution of the electrolysis module, after the step of storing the disinfected ballast water in the ballast tank.

DESCRIPTION OF DRAWINGS

FIG. 1 is a circuit diagram showing a schematic configuration of an apparatus for treating ballast water according to a first embodiment of the present invention.

FIG. 2 is a circuit diagram showing a schematic configuration of an apparatus for treating ballast water according to a second embodiment of the present invention.

FIG. 3 is a circuit diagram showing a schematic configuration of an apparatus for treating ballast water according to a third embodiment of the present invention.

FIG. 4 is a circuit diagram showing a schematic configuration of an apparatus for treating ballast water according to a fourth embodiment of the present invention.

FIG. 5 is a circuit diagram showing a schematic configuration of an apparatus for treating ballast water according to a fifth embodiment of the present invention.

FIG. 6 is a circuit diagram showing a schematic configuration of an apparatus for treating ballast water according to a sixth embodiment of the present invention.

FIG. 7 is a flow chart showing a method for treating deleterious substances contained in the ballast water according to the first embodiment of the present invention.

FIG. 8 is a flow chart showing a method for treating deleterious substances contained in the ballast water according to the second embodiment of the present invention.

FIG. 9 is a flow chart showing a method for treating deleterious substances contained in the ballast water according to the third embodiment of the present invention.

FIG. 10 is a flow chart showing a method for treating deleterious substances contained in the ballast water according to the fourth embodiment of the present invention.

FIG. 11 is a flow chart showing a method for treating deleterious substances contained in the ballast water according to the fifth embodiment of the present invention.

FIG. 12 is a flow chart showing a method for treating deleterious substances contained in the ballast water according to the sixth embodiment of the present invention.

FIG. 13 is a circuit diagram showing a schematic configuration of an apparatus for treating ballast water according to one prior art indirect electrolysis of seawater.

FIG. 14 is a circuit diagram showing a schematic configuration of an apparatus for treating ballast water according to another prior art indirect electrolysis of seawater.

FIG. 15 is a circuit diagram showing a schematic configuration of an apparatus for treating ballast water according to still another prior art direct electrolysis of seawater.

MODE FOR INVENTION

Hereinafter, an explanation on an apparatus and a method for treating ballast water according to the preferred embodiments of the present invention will be in detail given with reference to the attached drawings. If it is determined that the detailed description on the well-known functions or configurations related to the invention will be inhibited to understand the subject matters of the invention, their detailed explanation will be avoided.

FIG. 1 is a circuit diagram showing a schematic configuration of an apparatus for treating ballast water according to a first embodiment of the present invention. As shown, there is provided an apparatus for treating ballast water including: a pre-processing filter 1 adapted to filter aquatic microorganisms from the ballast water flowing thereinto; a seawater supply pump 2 adapted to adjust a flow rate of the ballast water supplied from the pre-processing filter 1 under the control of a control system 12 and to supply the adjusted flow rate of ballast water to an electrolysis module 4; flow rate control valves 3 adapted to adjust a flow rate of the ballast water supplied from the seawater supply pump 2 under the control of the control system 12 and to supply the adjusted flow rate of ballast water to the electrolysis module 4; the electrolysis module 4 adapted to adjust a concentration of sodium hypochlorite and to produce the concentration-adjusted sodium hypochlorite with an amount of current supply controlled under the control of the control system 12 at the time of producing the sodium hypochlorite from the ballast water supplied from the flow rate control valves 3; a gas-liquid separator 5 adapted to separate hydrogen gas generated as residual products during the production of the sodium hypochlorite in the electrolysis module 4 from the ballast water; a blower 6 adapted to supply outside air to the gas-liquid separator 5 and to dilute the separated hydrogen gas; an automatic injector 11 adapted to supply the sodium hypochlorite from which the hydrogen gas is removed through the gas-liquid separator 5 to a seawater intake line 20 connected to a ballast tank 13; a salinometer 8 adapted to measure the sodium chloride (NaCl) of the ballast water flowing into the ballast tank 13 through the seawater intake line 20; a flow rate meter 9 adapted to measure the flow rate of the ballast water flowing into the ballast tank 13 through the seawater intake line 20; a residual chlorine meter 10 disposed in the front and back seawater lines of the ballast tank 13 and adapted to measure an amount of residual chlorine of the ballast water into which the sodium hypochlorite is injected; an injection nozzle 14 adapted to inject a reducing agent neutralizing the residual chlorine in the ballast water passed through a seawater discharge line 21 at the time of discharging the ballast water stored in the ballast tank 13 to sea; a micro bubble generator 18 adapted to mix the reducing agent and the ballast water branched from the seawater discharge line 21 to form micro bubbles and to supply the micro bubbles to the injection nozzle 14; an injection pump 15 adapted to adjust a flow rate of the reducing agent supplied from the micro bubble generator 18 under the control of the control system 12 and to supply the adjusted flow rate of the reducing agent; a reducing agent-storing tank 17 adapted to store the reducing agent to be discharged by means of the injection pump 15 therein; a vortex generator 19 disposed in the seawater discharge line 21 at the rear end of the injection nozzle 14 to generate vortexes helping the neutralizing reaction of the reducing agent; a residual chlorine measurer 16 disposed in the seawater discharge line 21 at the rear end of the vortex generator 19 to measure a total amount of residual chlorine of the ballast water finally discharged and to measure a degree of harmlessness of the ballast water; and the control system 12 adapted to receive the information from the salinometer 8, the flow rate meter 9 and the residual chlorine measurer 10 and to control the seawater supply pump 2, the flow rate control valves 3 and the electrolysis module 4 under the received information, so as to inject only a desired amount of sodium hypochlorite into the ballast water flowing into the ballast tank 13, and adapted to receive the information from the residual chlorine measurer 10 to determine an amount of reducing agent and the information from the residual chlorine measurer 16 measuring a degree of harmlessness of the ballast water and to control the micro bubble generator 18 and the injection pump 15 under the received information, so as to inject the reducing agent neutralizing the sodium hypochlorite into the ballast water discharged to the sea and to have only a desired amount of residual chlorine in the ballast water.

The blower 6 is circuit connected to the control system 12 and is controlled by the under of the control system 12.

The salinometer 8, the flow rate meter 9 and the residual chlorine measurer 10 are disposed in the seawater intake line 20 passed through the pre-processing filter 1, and the residual chlorine measurer 10 is disposed in the seawater intake and discharge lines 20 and 21 at the front and back sides of the ballast tank 13 passed through the automatic injector 11.

Hereinafter, an explanation on each part will be in detail given.

The pre-processing filter 1 has functions of a general filter and removes aquatic microorganism having a predetermined size (of 50 μm or 30 μm). The pre-processing filter 1 has an automatic back flushing function and predetermined structure and capacity so that the ballast water can be continuously treated.

Desirably, the seawater supply pump 2 is a booster pump that can maintain a predetermined pressure so as to prevent the falling of the pressure of the pipe branched from the seawater intake line 20 connected to the ballast tank 13 and to perform stable supply of ballast water to the electrolysis module 4. Also, the seawater supply pump 2 is configured to increase or decrease the amount of ballast water supplied under the control of the control system 12.

The flow rate control valves 3 are a plurality of flow control valves that supplies the ballast water at a predetermined flow rate to the electrolysis module 4, and the plurality of flow control valves are selectively opened and closed under the control of the control system 12 receiving the signal from the salinometer 8, thereby supplying the ballast water at the predetermined flow rate in accordance with the concentrations of the salinity to the electrolysis module 4.

The reason why the ballast water is controlled at the flow rate in accordance with the concentrations of the salinity and is supplied to the electrolysis module 4 is explained hereinafter.

The concentration of NaCl in the ballast water supplied to the electrolysis module 4 in which the sodium hypochlorite is generated is generally in a range of 2.5% to 3%, and at this time, the current efficiency of the electrolysis module 4 becomes constantly maintained.

If the concentration of NaCl is less than 2.5%, the current efficiency becomes decreased, and accordingly, more current should be supplied by the decrease of the current efficiency or the seawater should be supplied at a condensed state. However, the supply of much more current than the rated capacity of the electrolysis module 4 causes the reduction of the life period of the electrode and the over-design thereof, and the installation of separate condensing equipment causes the problems of the installation area and the discharge of diluting water, which has a limit in the installation.

Since the chlorine demand (of about 2 ppm to 10 ppm) for disinfecting the ballast water is constant, the electrical signal outputted from the flow rate meter 9 is received to inject the sodium hypochlorite in accordance with the variations of the amount of ballast water to be treated. The amount of injection of the sodium hypochlorite is maintained constantly in accordance with the concentrations of the seawater, and the current values of the electrolysis module 4 are adjusted to control the concentration of the sodium hypochlorite.

Accordingly, if the flow rate of the seawater having a low concentration supplied to the electrolysis module 4 is increased, the current efficiency is increased (wherein the concentration gradient of electrode surface is small). Thus, if the concentration of seawater is low, the flow rate is increased to stably manage the equipment, without any decrease of current efficiency (wherein the amount of sodium hypochlorite produced is constant), and the concentration of the sodium hypochlorite of the ballast water can be controlled irrespective of concentration disturbances.

The electrolysis module 4 is a device for performing electrolysis for NaCl of seawater supplied thereto to convert the NaCl into sodium hypochlorite, and the electrolysis module 4 adopted in the present invention includes a general electrolysis device for performing the electrolysis for seawater and producing sodium hypochlorite and a power supply rectifier for stably supplying power to the electrolysis device. The electrolysis module 4 is circuit connected to the control system 12 wherein the current value supplied to the power supply rectifier thereof is adjusted in accordance with the information inputted from the flow rate meter 9, so that the concentration of the sodium hypochlorite produced is controlled.

The gas-liquid separator 5 is a device wherein as moist hydrogen gas as the residual product after the electrolysis of the electrolysis module 4 is discharged by 0.46 m3/kAh, the moist hydrogen gas is separated into the sodium hypochlorite and the hydrogen gas within a substantially short period of time, and the hydrogen gas is diluted to less than 1% (LEL 4%) with outside air.

The blower 6 is adapted to supply the outside air to the gas-liquid separator 5 so as to dilute the hydrogen gas.

The salinometer 8 is adapted to measure NaCl of the ballast water flowing and to send the information on the concentration of NaCl to the control system 12 wherein the seawater supply pump 2 and the flow rate control valves 3 are controlled with the information received thereto.

The flow rate meter 9 is adapted to measure the flow rate of the ballast water flowing in the ballast tank 13 and to provide basic data controlling the current value of the electrolysis module 4 within the rated range.

That is, since desired chlorine demand (of about 2 ppm to 10 ppm) for disinfecting the ballast water is constant, the electrical signal outputted from the flow rate meter 9 is received to inject the sodium hypochlorite in accordance with the variations of the amount of ballast water to be treated. The amount of injection of the sodium hypochlorite is maintained constantly, and the current value of the electrolysis module 4 is adjusted, thereby controlling the concentration of the sodium hypochlorite.

The residual chlorine measurer 10 is adapted to measure the amount of residual chlorine after the injection of the sodium hypochlorite and to correct the current value of the electrolysis module 4 in proportion to the flow rate of the ballast water.

The automatic injector 11 is adapted to supply the sodium hypochlorite by using the variation of the pressure of the ballast water, without having separate power.

The control system 12 is circuit connected to the pre-processing filter 1, the seawater supply pump 2, the flow rate control valves 3, the electrolysis module 4, the blower 6, the salinometer 8, the flow rate meter 9 and the residual chlorine measurer 10, so as to produce and inject the sodium hypochlorite into the ballast water flowing into the ballast tank 13, and controls them by receiving their state information in accordance with desired amounts of residual chlorine (in a range of about 2 ppm to 10 ppm) of the ballast water. In other words, the control system 12 receives the information from the salinometer 8, the flow rate meter 9 and the residual chlorine measurer 10 and controls the flow rate control valves 3 and the electrolysis module 4 with the information received thereto, so as to inject the sodium hypochlorite into the ballast water, while having a desired amount of residual chlorine (in a range of about 2 ppm to 10 ppm) in the ballast water.

Also, at the time of discharging the ballast water containing the residual chlorine after the disinfection through the sodium hypochlorite to the sea, the control system 12 is circuit connected to the micro bubble generator 18, the injection pump 15, the reducing agent-storing tank 17 and the residual chlorine measurers 10 and 16 and controls them by receiving their state information in accordance with desired amounts of residual chlorine (in a range of about 0.5 ppm to 2 ppm) of the ballast water. That is, the control system 12 receives the information from the residual chlorine measurers 10 and 16 and controls the micro bubble generator 18 and the injection pump 15 with the information received thereto, so as to inject the reducing agent neutralizing the sodium hypochlorite into the ballast water, while having a desired amount of residual chlorine (in a range of about 0.5 ppm to 2 ppm).

In more detail, the disinfection and control method of the ballast water is carried out wherein the ballast water is supplied through a ballast pump, the aquatic microorganisms having a size in a range of more than 30 μm or 50 μm are removed by means of the pre-processing filter 1, and the sodium hypochlorite is made with the ballast water flowing through the branched pipe disposed at the back end of the pre-processing filter 1. So as to produce a predetermined amount of sodium hypochlorite in accordance with the amount of ballast water flowing and to constantly maintain the current efficiency of the electrolysis module 4, in this case, the controls as shown in Table 1 are carried out.

TABLE 1

| Kinds of Disturbances | Detector | Control Method |
|---|---|---|
| Variation of concentration of ballast water | Salinometer | Adjustment of flow rate |
| Increase/decrease of flow rate of ballast water | Flow rate meter | Increase/decrease of current of electrolysis module |

Also, the control method of the residual chlorine at the time of discharging the ballast water is carried out wherein the concentration of the residual chlorine is obtained through the residual chlorine measurer 10, the flow rate of the reducing agent supplied from the injection pump 15 is controlled with chemical equivalent of the ratio of 1 to 1, and the concentration of the residual chlorine is continuously monitored during the discharging through the residual chlorine measurer 16 to activate the micro bubble generator 18 as auxiliary means at the upper limit of the managing range (in a range of about 0.5 ppm to 2 ppm), thereby controlling the concentration of the residual chlorine under the managing range (in a range of about 0.5 ppm to 2 ppm).

The ballast tank 13 is a space that stores the ballast water therein and manages the draft line and trim of the ship when the ship does not have any cargos therein, so that the ship can sail safely, while having a predetermined weight.

The injection nozzle 14 is adapted to inject a mixture obtained by mixing a portion of the ballast water and the reducing agent.

The injection pump 15 is adapted to inject a predetermined amount of reducing agent and controls the flow rate of the reducing agent (with chemical equivalent of the ratio of 1 to 1) under the control of the control system 12 in accordance with the values of the total concentration of the residual chlorine measured by the residual chlorine measurer 10 at the time of discharging the ballast water through the injection pump 15.

During the idle time (in the supply of the reducing agent), also, the injection pump 15 is adapted to circulate the reducing agent-storing tank 17 periodically, thereby preventing salt precipitation from occurring.

The residual chlorine measurer 16 is adapted to measure the total concentration of residual chlorine of the ballast water finally discharged to measure the degree of harmlessness thereof, so that the ballast water can be discharged in the managing concentration range (of 0.5 ppm to 2 ppm). Thus, the activation of the micro bubble generator 18 is determined by the total concentration of residual chlorine of the ballast water.

The reducing agent-storing tank 17 is a space that stores one selected from sulfite reducing agents such as sulfite, thiosulfate, sulfite plus iodide, dithionite, and calcium sulfite or stores one selected from ascorbic acid, hydroxylamine, and PAO, which is stored in a saturated concentration at a room temperature.

The micro bubble generator 18 is adapted to generate micro bubbles by pressurizing or pulverizing the outside air by means of a pump to remove the residual chlorine and to increase the mixing effect of the reducing agent, which is intermittently activated by means of the signal sent from the residual chlorine measurer 16.

The vortex generator 19 is disposed in the interior of the pipe of the seawater discharge line 21 and includes a plurality of screws rotatably mounted to allow the reducing agent passed through the seawater discharge line 21 to be easily mixed with the ballast water. The plurality of screws is rotated by means of a motor (or a submersible motor), and the motor is activated by means of a power supply device. Typical means applying a rotary force to the plurality of screws are all adopted here.

Next, an explanation on the operation of the apparatus for treating ballast water according to the first embodiment of the present invention as shown in FIG. 1 will be in detail given.

The ballast water flowing from the seawater intake line 20 connected to the outside of the ship is passed through the pre-processing filter 1 for filtering the aquatic microorganisms therefrom, and the ballast water from which the aquatic microorganisms are removed is passed through the seawater supply pump 2 and the flow rate control valves 3 controlled under the control of the control system 12 and is supplied to the electrolysis module 4 controlled under the control of the control system 12. Next, the electrolysis for the ballast water is performed by means of the electrolysis module 4. Sodium chloride (NaCl) and water ($H_2O$) as the components of the ballast water are split into chlorine ($Cl_2$), sodium hydroxide (NaOH), and hydrogen ($H_2$), and the chlorine ($Cl_2$) and the sodium hydroxide (NaOH) are chemically reacted to form the sodium hypochlorite (NaOCl), which is used as a disinfectant.

The sodium hypochlorite (NaOCl) produced in the electrolysis module 4 is passed through the gas-liquid separator 5 wherein the hydrogen gas generated as residual products during the production of the sodium hypochlorite in the electrolysis module 4 is removed from the ballast water, and then, the separated hydrogen gas through the gas-liquid separator 5 is diluted by means of the blower 6.

The sodium hypochlorite from which the hydrogen gas is removed through the gas-liquid separator 5 is mixed with the ballast water flowing through the automatic injector 11, such that the ballast water is disinfected. Next, the disinfected ballast water flows into the ballast tank 13 and is stored therein.

At this time, the amount of residual chlorine in the ballast water flowing into the ballast tank 13 is measured by means of the residual chlorine measurer 10, and the measured information is sent to the control system 12. The control system 12 receives the measured information from the salinometer 8 measuring the sodium chloride (NaCl) of the ballast water flowing into the ballast tank 13 through the seawater intake line 20 and from the flow rate meter 9 measuring the flow rate of the ballast water flowing into the ballast tank 13 through the seawater intake line 20 and controls the amount of ballast water supply through the branched pipe by means of the seawater supply pump 2 and the flow rate control valves 3. Moreover, the control system 12 controls the amount of sodium hypochlorite (NaOCl) produced by means of the electrolysis module 4.

After that, if a predetermined period of time is passed, the sodium hypochlorite (NaOCl) contained in the ballast water stored in the ballast tank 13 is reduced to sodium chloride (NaCl) according to natural reduction features and is changed to the seawater being at a natural state. The seawater at the natural state is discharged through the seawater discharge line 21 to the outside of the ship. Typically, since the whole amount of sodium hypochlorite (NaOCl) is not reduced, a portion of sodium hypochlorite (NaOCl) still remains, and therefore, a process for reducing the sodium hypochlorite (NaOCl) is required.

So as to perform the reducing process of the sodium hypochlorite (NaOCl), the reducing agent, which is adapted to neutralize the chlorine component remaining in the ballast water passed through the seawater discharge line 21 at the time of discharging the ballast water stored in the ballast tank 13 to the sea, is injected through the injection nozzle 14. If one selected from sulfite reducing agents such as sulfite, thiosulfate, sulfite plus idodide, dithionite, and calcium sulfite or one selected from ascorbic acid, hydroxylamine, and PAO is injected through the injection nozzle 14, a neutralization reaction for the sodium hypochlorite (NaOCl) occurs, so that the sodium hypochlorite (NaOCl) is reduced to sodium chloride (NaCl).

At this time, the micro bubble generator 18 and the vortex generator 19 are activated such that the neutralization reaction occurs rapidly and reliably by means of the reducing agent.

The information on the amount of residual chlorine of the ballast water passed through the vortex, generator 19 is sent to the control system 12 from the residual chlorine measurer 16, and if the amount of residual chlorine is larger than a desired target value thereof, the micro bubble generator 18 and the injection pump 15 are controlled such that the amount of residual chlorine of the ballast water discharged is controlled to correspond to the desired target value.

FIG. 2 is a circuit diagram showing a schematic configuration of an apparatus for treating ballast water according to a second embodiment of the present invention, wherein most of the configuration thereof is the same as that in FIG. 1. Hereinafter, only components different from those in FIG. 1 will be explained.

According to a second embodiment of the present invention, the apparatus for treating ballast water further includes a cleaning/injection pump 7 connected at one side thereof to the line branched from the sodium hypochlorite supply line between the gas-liquid separator 5 and the automatic injector 11 and connected at the other side thereof to the line branched between the flow rate control valves 3 and the electrolysis module 4, so as to continuously or periodically circulate the sodium hypochlorite passed through the gas-liquid separator 5 to the electrolysis module 4 in which the production of the sodium hypochlorite stops.

If the activation of the electrolysis module 4 stops, the ballast water and some sodium hypochlorite stay in the interior of the apparatus for a predetermined period of time, without any movement, such that the pollution sources (containing microorganisms and foreign substances) stick to the device to cause the device to be damaged. Accordingly, the sodium hypochlorite passed through the gas-liquid separator 5 is circulated among the electrolysis module 4, the gas-liquid separator 5 and the cleaning/injection pump 7, thereby preventing the pollution sources from sticking to the device.

So as to prevent the ballast water from being supplied to the flow rate control valves 3 and the automatic injector 11, during this process, a diverter valve is mounted on each branched pipe to allow a passageway to become a closed circuit.

The cleaning/injection pump 7 is circuit connected to the control system 12 and is operated continuously or periodically to control the circulation amount of ballast water supplied.

So as to immediately supply the sodium hypochlorite to the automatic injector 11 at the time of production of the sodium hypochlorite in the electrolysis module 4, further, the cleansing/injection pump 7 is adapted to pressurize the sodium hypochlorite supplied through the branched line after passed through the gas-liquid separator 5 and to supply the pressurized sodium hypochlorite to the main supply line of the sodium hypochlorite.

Referring in more detail to the cleansing/injection pump 7, the apparatus for treating ballast water is intermittently operated according to the characteristics thereof, and the pollution sources (such as scales, salt precipitation, and slime) of the equipment (especially, the electrolysis module 4) are formed during the idle time. So as to prevent the formation of the pollution sources, the cleansing/injection pump 7 circulates the sodium hypochlorite remaining in the electrolysis module 4 and the gas-liquid separator 5 periodically.

Also, the cleansing/injection pump 7 is not operated in a normal operating condition (having salt water having NaCl of 3%), and at the time of the use in the seawater having a low concentration, it can be used as an auxiliary pump at the time of injecting the sodium hypochlorite according to the increase of the flow rate of the ballast water.

Further, at the time of an emergency operating condition (at the time of needing rapid injection), the cleansing/injection pump 7 serves to inject the sodium hypochlorite.

Even though not shown in the drawings, a passageway change valve (a manually operating or electronic valve) is disposed in a passageway branched between the flow rate control valves 3 and the electrolysis module 4 and connected to the cleaning/injection pump 7 and in a passageway branched between the gas-liquid separator 5 and the automatic injector 11 and connected to the cleaning/injection pump 7, which is controlled manually or remotely by the control of the control system 12.

Next, an explanation on the operation of the apparatus for treating ballast water according to the second embodiment of the present invention as shown in FIG. 2 will be in detail given.

The operation of the apparatus according to the second embodiment of the present invention is the same as that according to the first embodiment of the present invention, except that if the production of the sodium hypochlorite is stopped, the sodium hypochlorite remaining in the electrolysis module 4 and the gas-liquid separator 5 is circulated periodically so as to prevent the formation of the pollution sources (such as scales, salt precipitation, and slime) of the electrolysis module 4.

FIG. 3 is a circuit diagram showing a schematic configuration of an apparatus for treating ballast water according to a third embodiment of the present invention, wherein most of the configuration thereof is the same as that in FIG. 1.

According to the third embodiment of the present invention, however, the apparatus is provided at the back portion of the ballast tank 13, and therefore, the residual chlorine measurer 10, as shown in FIG. 1, which is disposed in the seawater intake and discharge lines 20 and 21 at the front and back of the ballast tank 13, is not provided therein. Instead of the formation of the residual chlorine measurer 10, the pre-processing filter 1 as shown in FIG. 1 is disposed in the seawater line at the front of the ballast tank 13, and after the formation of the ballast tank 13, a branch pipe is disposed between the salinometer 8 and the flow rate meter 9 and is connected to the electrolysis module 4 wherein the sodium hypochlorite is produced. Then, the ballast water is passed through the gas-liquid separator 5 and the automatic injector 11, such that it is disinfected by the injection of the sodium hypochlorite. After that, the reducing process of the residual chlorine components for the disinfected ballast water is carried out by means of the equipment mounted at the back of the automatic injector 11.

Hereinafter, an explanation on the configuration of the apparatus for treating ballast water according to the third embodiment of the present invention will be in detail given.

As shown, there is provided the apparatus for treating ballast water including: a pre-processing filter 1 disposed in a seawater intake line 20 at the front of a ballast tank 13; a salinometer 8 adapted to measure the sodium chloride (NaCl) of the ballast water discharged from the ballast tank 13 and flowing along a seawater discharge line 21; a seawater supply pump 2 adapted to adjust a flow rate of the ballast water supplied through a branch pipe branched from a portion of the seawater discharge line 21 after passing the salinometer 8 under the control of a control system 12 and to supply the adjusted flow rate of ballast water to an electrolysis module 4; flow rate control valves 3 adapted to adjust the flow rate of the ballast water supplied from the seawater supply pump 2 under the control of the control system 12 and to supply the adjusted flow rate ballast water to the electrolysis module 4; the electrolysis module 4 adapted to adjust a concentration of sodium hypochlorite and to produce the concentration-adjusted sodium hypochlorite with an amount of current supply controlled under the control of the control system 12 at the time of producing the sodium hypochlorite from the ballast water supplied from the flow rate control valves 3; a gas-liquid separator 5 adapted to separate hydrogen gas generated as residual products during the production of the sodium hypochlorite in the electrolysis module 4 from the ballast water; a blower 6 adapted to supply outside air to the gas-liquid separator 5 and to dilute the separated hydrogen gas; an automatic injector 11 adapted to supply the sodium hypochlorite from which the hydrogen gas is removed through the gas-liquid separator 5 to the seawater discharge line 21 passed through the flow rate meter 9; a flow rate meter 9 adapted to measure the flow rate of the ballast water flowing through the seawater discharge line 21 passed through the portion branched toward the seawater supply pump 2 thereof; a vortex generator 19 adapted to generate vortexes in the ballast water passed through the automatic injector 11; an injection nozzle 14 adapted to inject a reducing agent neutralizing the residual chlorine remaining in the ballast water before the ballast water passed through the vortex generator 19 is discharged to sea; a micro bubble generator 18 adapted to mix the reducing agent and the ballast water branched from the seawater discharge line 21 to form micro bubbles and to supply the micro bubbles to the injection nozzle 14; an injection pump 15 adapted to adjust a flow rate of the reducing agent supplied from the micro bubble generator 18 under the control of the control system 12 and to supply the adjusted flow rate of the reducing agent; a reducing agent-storing tank 17 adapted to store the reducing agent to be discharged by means of the injection pump 15 therein; a vortex generator 19 disposed in the seawater discharge line 21 at the rear end of the injection nozzle 14 to generate vortexes helping the neutralizing reaction of the reducing agent; a residual chlorine measurer 16 disposed in the seawater discharge line 21 at the rear end of the vortex generator 19 to measure a total amount of residual chlorine of the ballast water finally discharged and to measure a degree of harmlessness of the ballast water; and the control system 12 adapted to receive the information from the salinometer 8 and the flow rate meter 9 and to control the seawater supply pump 2, the flow rate control valves 3 and the electrolysis module 4 under the received information, so as to inject only a desired amount of sodium hypochlorite into the ballast water discharged from the ballast tank 13, adapted to receive the information from the residual chlorine measurer 16 and to control the micro bubble generator 18 and the injection pump 15 under the received information, so as to inject the reducing agent neutralizing the sodium hypochlorite into the ballast water discharged to the sea and to have only a desired amount of residual chlorine in the ballast water.

Hereinafter, an explanation on the operation of the apparatus for treating ballast water according to the third embodiment of the present invention as shown in FIG. 3 will be in detail given.

First, the ballast water flowing from the seawater intake line 20 connected to the outside of the ship into the ballast tank 13 is passed through the pre-processing filter 1 for filtering the aquatic microorganisms therefrom, and the ballast water from which the aquatic microorganisms are removed is passed through the seawater supply pump 2 and the flow rate control valves 3 controlled under the control of the control system 12 and is supplied to the electrolysis module 4 controlled under the control of the control system 12. Next, the electrolysis for the ballast water is performed by means of the electrolysis module 4. Sodium chloride (NaCl) and water ($H_2O$) as the components of the ballast water are split into chlorine ($Cl_2$), sodium hydroxide (NaOH), and hydrogen ($H_2$), and the chlorine ($Cl_2$) and the sodium hydroxide (NaOH) are chemically reacted to form the sodium hypochlorite (NaOCl), which is used as a disinfectant.

The sodium hypochlorite (NaOCl), produced in the electrolysis module 4 is passed through the gas-liquid separator 5 wherein the hydrogen gas generated as residual products during the production of the sodium hypochlorite in the electrolysis module 4 is removed from the ballast water, and then, the separated hydrogen gas through the gas-liquid separator 5 is diluted by means of the blower 6.

The sodium hypochlorite from which the hydrogen gas is removed through the gas-liquid separator 5 is mixed with the ballast water flowing through the automatic injector 11, such that the ballast water is disinfected.

At this time, the control system 12 receives the measured information from the salinometer 8 measuring the sodium chloride (NaCl) of the ballast water flowing thereto and from the flow rate meter 9 measuring the flow rate of the ballast water flowing through the seawater line and controls the amount of ballast water supplied through the branched pipe by means of the seawater supply pump 2 and the flow rate control valves 3. Moreover, the control system 12 controls the amount of sodium hypochlorite (NaOCl) produced by means of the electrolysis module 4.

After that, the continual reducing process for the disinfected ballast water is carried out, and thus, the reducing agent is injected by means of the injection nozzle 14 into the ballast water supplied in a vortex form by the vortex generator 19 helping the neutralization of the residual chlorine contained in the ballast water. Like this, if one selected from sulfite reducing agents such as sulfite, thiosulfate, sulfite plus iodide, dithionite, and calcium sulfite or one selected from ascorbic acid, hydroxylamine, and PAO is injected through the injection nozzle 14, the neutralization reaction for the sodium hypochlorite (NaOCl) occurs, so that the sodium hypochlorite (NaOCl) is reduced to sodium chloride (NaCl).

At this time, the micro bubble generator 18 and the vortex generator 19 are activated such that the neutralization reaction occurs rapidly and reliably by means of the reducing agent. The information on the amount of residual chlorine of the ballast water passed through the vortex generator 19 is sent to the control system 12 from the residual chlorine measurer 16, and if the amount of residual chlorine is larger than a desired target value thereof, the micro bubble generator 18 and the injection pump 15 are controlled such that the amount of residual chlorine of the ballast water discharged is controlled to correspond to the desired target value.

FIG. 4 is a circuit diagram showing a schematic configuration of an apparatus for treating ballast water according to a fourth embodiment of the present invention, wherein since the basic configuration and operating principles thereof are the same as those in FIG. 2, and an explanation on them will be avoided.

FIG. 5 is a circuit diagram showing a schematic configuration of an apparatus for treating ballast water according to a fifth embodiment of the present invention, wherein the basic configuration thereof is the same as that in FIG. 1, except that the seawater used to produce the sodium hypochlorite is not supplied from the seawater intake line 20 flowing to the ballast tank 13 but supplied selectively from a cooling seawater line before heat exchange 22 and from a cooling seawater line after heat exchange 23.

Generally, the seawater used for other proposes as well as the ballast water exist in the ship. That is, when various equipment and an engine in the ship are cooled, freshwater is used for direct cooling through a circulation loop, and the cooled seawater (such as circulating water and freshwater) used for the cooling is heat exchanged with the seawater, thereby emitting heat therefrom. The seawater used in the fifth embodiment of the present invention as shown in FIG. 5 is used through the branching of the seawater.

The above-mentioned configuration has the following advantages.

Firstly, if the equipment for producing the sodium hypochlorite is installed in the seawater intake line 20 or the seawater discharge line 21, the installation space is small and the space utilization is not good, but the formation of the cooling seawater system lines enables the installation space to be utilized well.

Secondly, at the time of producing the sodium hypochlorite by using the ballast water as raw water, the production efficiency is drastically lowered under 10° C., but if the cooling seawater system lines are adopted, the seawater having a predetermined constant temperature or above 10° C. is always supplied, thereby easily performing the concentration control and the reliable operation of the apparatus.

Accordingly, a cooled seawater side pre-processing filter 24 is disposed between the cooling seawater line before heat exchange 22 or the cooling seawater line after heat exchange 23 passed through a heat exchanger 25 and a seawater supply pump 2 and performs general filtering and the removal of the aquatic microorganisms having specific sizes (in a range of 50 μm or 30 μm).

The reason why the seawater is supplied selectively from the cooling seawater line before heat exchange 22 and from the cooling seawater line after heat exchange 23 passed through the heat exchanger 25 through a diverter valve (not shown) is that the temperature of the seawater is different from the temperature of the cooled seawater heat-exchanged with the freshwater or circulating water.

Of course, the production efficiency of the sodium hypochlorite is higher with the cooled seawater that is not passed through the heat exchanger 25 when compared with the seawater supplied directly, but if the temperature of the seawater is lowered in a winter season, the temperature of the cooled seawater is lowered. At this time, if the seawater is supplied from the cooling seawater line after heat exchange 23 passed through the heat exchanger 25, the production efficiency of the sodium hypochlorite can be more improved.

According to the fifth embodiment of the present invention, as shown, there is provided the apparatus for treating ballast water including: the pre-processing filter 1 adapted to filter aquatic microorganisms from the ballast water flowing thereinto; the cooled seawater side pre-processing filter 24 adapted to remove the aquatic microorganisms of the cooled seawater flowing selectively from the cooling seawater line before heat exchange 22 or the cooling seawater line after heat exchange 23 passed through the heat exchanger 25; the seawater supply pump 2 adapted to adjust a flow rate of the cooled seawater supplied from the cooled seawater side pre-processing filter 24 under the control of a control system 12 and to supply the adjusted flow rate of cooled seawater to an electrolysis module 4; flow rate control valves 3 adapted to adjust a flow rate of the cooled seawater supplied from the seawater supply pump 2 under the control of the control system 12 and to supply the adjusted flow rate of cooled seawater to the electrolysis module 4; the electrolysis module 4 adapted to adjust a concentration of sodium hypochlorite and to produce the concentration-adjusted sodium hypochlorite with an amount of current supply controlled under the control of the control system 12 at the time of producing the sodium hypochlorite from the cooled seawater supplied from the flow rate control valves 3; a gas-liquid separator 5 adapted to separate hydrogen gas generated as residual products during the production of the sodium hypochlorite in the electrolysis module 4 from the cooled seawater; a blower 6 adapted to supply outside air to the gas-liquid separator 5 and to dilute the separated hydrogen gas; an automatic injector 11 adapted to supply the sodium hypochlorite from which the hydrogen gas is removed through the gas-liquid separator 5 to a seawater intake line 20 connected to a ballast tank 13; a salinometer 8 adapted to measure the sodium chloride (NaCl) of the cooled seawater flowing into the heat exchanger 25 through the cooling seawater line after heat exchange 22; a flow rate meter 9 adapted to measure the flow rate of the ballast water flowing into the ballast tank 13 through the seawater intake line 20; a residual chlorine meter 10 disposed at the front and back seawater lines of the ballast tank 13 and adapted to measure an amount of residual chlorine of the ballast water into which the sodium hypochlorite is injected; an injection nozzle 14 adapted to inject a reducing agent neutralizing the residual chlorine in the ballast water passed through a seawater discharge line 21 at the time of discharging the ballast water stored in the ballast tank 13 to sea; a micro bubble generator 18 adapted to mix the reducing agent and the ballast water branched from the seawater discharge line 21 to form micro bubbles and to supply the micro bubbles to the injection nozzle 14; an injection pump 15 adapted to adjust a flow rate of the reducing agent supplied from the micro bubble generator 18 under the control of the control system 12 and to supply the adjusted flow rate of the reducing agent; a reducing agent-storing tank 17 adapted to store the reducing agent to be discharged by means of the injection pump 15 therein; a vortex generator 19 disposed in the seawater discharge line 21 at the rear end of the injection nozzle 14 to generate vortexes helping the neutralizing reaction of the reducing agent; a residual chlorine measurer 16 disposed in the seawater discharge line 21 at the rear end of the vortex generator 19 to measure a total amount of residual chlorine of the ballast water finally discharged and to measure a degree of harmlessness of the ballast water; and the control system 12 adapted to receive the information from the salinometer 8, the flow rate meter 9 and the residual chlorine measurer 10 and to control the seawater supply pump 2, the flow rate control valves 3 and the electrolysis module 4 under the received information, so as to inject only a desired amount of sodium hypochlorite into the ballast water flowing into the ballast tank 13, and adapted to receive the information from the residual chlorine measurer 10 and the residual chlorine measurer 16 and controls the micro bubble generator 18 and the injection pump 15 under the received information, so as to inject the reducing agent neutralizing the sodium hypochlorite into the ballast water discharged to the sea and to have only a desired amount of residual chlorine in the ballast water.

Hereinafter, an explanation on the operation of the apparatus for treating ballast water according to the fifth embodiment of the present invention as shown in FIG. 5 will be in detail given.

First, the cooled seawater flowing along a cooling water system of the ship is passed through the cooled seawater pre-processing filter 24 that removes the aquatic microorganisms of the cooled seawater flowing selectively from the cooling seawater line before heat exchange 22 or the cooling seawater line after heat exchange 23 passed through the heat exchanger 25. The cooled seawater from which the aquatic microorganisms are removed is passed through the seawater supply pump 2 and the flow rate control valves 3 controlled under the control of the control system 12 and is supplied to the electrolysis module 4 controlled under the control of the control system 12. Next, the electrolysis for the cooled seawater is performed by means of the electrolysis module 4. Sodium chloride (NaCl) and water ($H_2O$) as the components of the cooled seawater are split into chlorine ($Cl_2$), sodium hydroxide (NaOH), and hydrogen ($H_2$), and the chlorine ($Cl_2$) and the sodium hydroxide (NaOH) are chemically reacted to form the sodium hypochlorite (NaOCl), which is used as a disinfectant.

The sodium hypochlorite (NaOCl) produced in the electrolysis module 4 is passed through the gas-liquid separator 5 wherein the hydrogen gas generated as residual products during the production of the sodium hypochlorite in the electrolysis module 4 is removed from the cooled seawater, and then, the separated hydrogen gas through the gas-liquid separator 5 is diluted by means of the blower 6.

The sodium hypochlorite from which the hydrogen gas is removed through the gas-liquid separator 5 is mixed with the ballast water flowing through the automatic injector 11, such that the ballast water is disinfected. Next, the disinfected ballast water flows into the ballast tank 13 and is stored therein.

At this time, the amount of residual chlorine flowing into the ballast tank 13 is measured by means of the residual chlorine measurer 10 and the measured information is sent to the control system 12. The control system 12 receives the measured information from the salinometer 8 measuring the sodium chloride (NaCl) of the seawater flowing to the cooling water system and from the flow, rate meter 9 measuring the flow rate of the ballast water flowing through the seawater intake line 20 into the ballast tank 13 and controls the amount of cooled seawater supplied through the branched pipe by means of the seawater supply pump 2 and the flow rate control valves 3. Moreover, the control system 12 controls the amount of sodium hypochlorite (NaOCl) produced by means of the electrolysis module 4.

After that, if a predetermined period of time is passed, the sodium hypochlorite (NaOCl) contained in the ballast water stored in the ballast tank 13 is reduced to sodium chloride (NaCl) according to natural reduction features and is changed to the seawater being at a natural state. The seawater at the natural state is discharged through the seawater discharge line 21 to the outside of the ship. Typically, since the whole amount of sodium hypochlorite (NaOCl) is not reduced, a portion of sodium hypochlorite (NaOCl) still remains, and therefore, a process for reducing the sodium hypochlorite (NaOCl) is required.

Accordingly, at the time of discharging the ballast water stored in the ballast tank 13 to the sea, the reducing agent neutralizing the residual chlorine in the ballast water is injected by means of the injection nozzle 14. Like this, if one selected from sulfite reducing agents such as sulfite, thiosulfate, sulfite plus iodide, dithionite, and calcium sulfite or one selected from ascorbic acid, hydroxylamine, and PAO is injected through the injection nozzle 14, the neutralization reaction for the sodium hypochlorite (NaOCl) occurs, so that the sodium hypochlorite (NaOCl) is reduced to sodium chloride (NaCl).

At this time, the micro bubble generator 18 and the vortex generator 19 are activated such that the neutralization reaction occurs rapidly and reliably by means of the reducing agent. The information on the amount of residual chlorine of the ballast water passed through the vortex generator 19 is sent to the control system 12 from the residual chlorine measurer 16, and if the amount of residual chlorine is larger than a desired target value thereof, the micro bubble generator 18 and the injection pump 15 are controlled such that the amount of residual chlorine of the ballast water discharged is controlled to correspond to the desired target value.

FIG. 6 is a circuit diagram showing a schematic configuration of an apparatus for treating ballast water according to a sixth embodiment of the present invention, wherein most of the configuration thereof is the same as that in FIG. 5. Hereinafter, only components different from those in FIG. 5 will be explained.

According to the sixth embodiment of the present invention, the apparatus for treating ballast water further includes a cleaning/injection pump 7 connected at one side thereof to the line branched from the sodium hypochlorite supply line between the gas-liquid separator 5 and the automatic injector 11 and connected at the other side thereof to the line branched between the flow rate control valves 3 and the electrolysis module 4, so as to continuously or periodically circulate the sodium hypochlorite passed through the gas-liquid separator 5 to the electrolysis module 4 in which the production of the sodium hypochlorite stops.

Next, an explanation on the methods for disinfecting the deleterious substances contained in the ballast water and reducing and discharging the ballast water according to the first to sixth embodiments of the present invention will be given with reference to FIGS. 7 to 12.

FIG. 7 is a flow chart showing a method for treating deleterious substances contained in the ballast water according to the first embodiment of the present invention.

As shown, there is provided the method for treating deleterious substances contained in the ballast water including the steps of: allowing the ballast water to flow (at a step S100); filtering aquatic microorganisms from the ballast water flowing (at a step S101); adjusting a flow rate of the ballast water so as to correspond to a desired amount of residual chlorine by means of a seawater supply pump and flow rate control valves under the control of a control system and supplying the adjusted flow rate of ballast water to an electrolysis module (at a step S102); adjusting a concentration of sodium hypochlorite in the ballast water supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the ballast water is sent (at a step S103); separating hydrogen gas contained in the sodium hypochlorite produced in the electrolysis module (at a step S104); supplying the sodium hypochlorite from which the hydrogen gas is removed to the ballast water flowing into a ballast tank and disinfecting the ballast water (at a step S105); storing the disinfected ballast water in the ballast tank (at a step S106); controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of a ship (at a step S107); generating vortexes in the ballast water to which the reducing agent is mixed to allow the reducing process for the ballast water to be accelerated (at a step S108); and discharging the ballast water to sea (at a step S109).

FIG. 8 is a flow chart showing a method for treating deleterious substances contained in the ballast water according to the second embodiment of the present invention, wherein most of the steps are the same as those in FIG. 7, except that one step is further added.

As shown, there is provided the method for treating deleterious substances contained in the ballast water including the steps of: allowing the ballast water to flow (at a step S100); filtering aquatic microorganisms from the ballast water flowing (at a step S101); adjusting a flow rate of the ballast water so as to correspond to a desired amount of residual chlorine by means of a seawater supply pump and flow rate control valves under the control of a control system and supplying the adjusted flow rate of ballast water to an electrolysis module (at a step S102); adjusting a concentration of sodium hypochlorite in the ballast water supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the ballast water is sent (at a step S103); separating hydrogen gas contained in the sodium hypochlorite produced in the electrolysis module (at a step S104); supplying the sodium hypochlorite from which the hydrogen gas is removed to the ballast water flowing into a ballast tank and disinfecting the ballast water (at a step S105); storing the disinfected ballast water in the ballast tank (at a step S106); continuously or intermittently circulating a predetermined amount of ballast water to the electrolysis module whose activation stops and preventing the pollution of the electrolysis module (at a step 110); controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of a ship (at a step S107); generating vortexes in the ballast water to which the reducing agent is mixed to allow the reducing process for the ballast water to be accelerated (at a step S108); and discharging the ballast water to sea (at a step S109).

FIG. 9 is a flow chart showing a method for treating deleterious substances contained in the ballast water according to the third embodiment of the present invention, wherein most of the steps are the same as those in FIG. 7, except that some steps are different in order.

As shown, there is provided the method for treating deleterious substances contained in the ballast water including the steps of: filtering aquatic microorganisms from the ballast water flowing (at a step S100); storing the ballast water from which the deleterious substances are removed into a ballast tank (at a step S101); adjusting a flow rate of the ballast water so as to correspond to a desired amount of residual chlorine by means of a seawater supply pump and flow rate control valves under the control of a control system and supplying the adjusted flow rate of ballast water to an electrolysis module (at a step S102); adjusting a concentration of sodium hypochlorite in the ballast water supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the ballast water is sent (at a step S103); separating hydrogen gas contained in the sodium hypochlorite produced in the electrolysis module (at a step S104); supplying the sodium hypochlorite from which the hydrogen gas is removed to the ballast water flowing along a seawater discharge line discharged to the outside of a ship into a ballast tank and disinfecting the ballast water (at a step S105); firstly generating vortexes in the ballast water having the sodium hypochlorite residual therein (at a step S106); controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of the ship (at a step S107); secondarily generating vortexes in the ballast water to which the reducing agent is mixed to allow the reducing process for the ballast water to be accelerated (at a step S108); and discharging the ballast water to sea (at a step S109).

FIG. 10 is a flow chart showing a method for treating deleterious substances contained in the ballast water according to the fourth embodiment of the present invention, wherein most of the steps are the same as those in FIG. 9, except that one step is further added.

As shown, there is provided the method for treating deleterious substances contained in the ballast water including the steps of: filtering aquatic microorganisms from the ballast water flowing (at a step S100); storing the ballast water from which the deleterious substances are removed into a ballast tank (at a step S101); adjusting a flow rate of the ballast water so as to correspond to a desired amount of residual chlorine by means of a seawater supply pump and flow rate control valves under the control of a control, system and supplying the adjusted flow rate of ballast water to an electrolysis module (at a step S102); adjusting a concentration of sodium hypochlorite in the ballast water supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the ballast water is sent (at a step S103); separating hydrogen gas contained in the sodium hypochlorite produced in the electrolysis module (at a step S104); supplying the sodium hypochlorite from which the hydrogen gas is removed to the ballast water flowing along a seawater discharge line discharged to the outside of a ship into a ballast tank and disinfecting the ballast water (at a step S105); firstly generating vortexes in the ballast water having the sodium hypochlorite residual therein (at a step S106); controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of the ship (at a step S107); secondarily generating vortexes in the ballast water to which the reducing agent is mixed to allow the reducing process for the ballast water to be accelerated (at a step S108); discharging the ballast water to sea (at a step S109); and continuously or intermittently circulating a predetermined amount of ballast water to the electrolysis module whose activation stops and preventing the pollution of the electrolysis module (at a step 110).

FIG. 11 is a flow chart showing a method for treating deleterious substances contained in the ballast water according to the fifth embodiment of the present invention, wherein most of the steps are the same as those in FIG. 7, except that some steps are in order.

As shown, there is provided the method for treating deleterious substances contained in the ballast water including the steps of: allowing the ballast water to flow (at a step S100); filtering aquatic microorganisms from the ballast water flowing (at a step S101); selectively flowing cooled seawater from a cooling seawater line before heat exchange and from a cooling seawater line after heat exchange (at a step S102); filtering aquatic microorganisms from the cooled seawater flowing into the apparatus (at a step S103); adjusting a flow rate of the cooled seawater so as to correspond to a desired amount of residual chlorine by means of a seawater supply pump and flow rate control valves under the control of a control system and supplying the adjusted flow rate of cooled seawater to an electrolysis module (at a step S104); adjusting a concentration of sodium hypochlorite in the cooled seawater supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the cooled seawater is sent (at a step S105); separating hydrogen gas contained in the sodium hypochlorite produced in the electrolysis module (at a step S106); supplying the sodium hypochlorite from which the hydrogen gas is removed to the ballast water flowing into a ballast tank and disinfecting the ballast water (at a step S107); storing the disinfected ballast water in the ballast tank (at a step S108); controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of a ship (at a step S109); generating vortexes in the ballast water to which the reducing agent is mixed to allow the reducing process for the ballast water to be accelerated (at a step S110); and discharging the ballast water to sea (at a step S111).

FIG. 12 is a flow chart showing a method for treating deleterious substances contained in the ballast water according to the sixth embodiment of the present invention, wherein most of the steps are the same as those in FIG. 11, except that some steps are added.

As shown, there is provided the method for treating deleterious substances contained in the ballast water including the steps of: allowing the ballast water to flow (at a step S100); filtering aquatic microorganisms from the ballast water flowing (at a step S101); selectively flowing cooled seawater from a cooling seawater line before heat exchange and from a cooling seawater line after heat exchange (at a step S102); filtering aquatic microorganisms from the cooled seawater flowing into the apparatus (at a step S103); adjusting a flow rate of the cooled seawater so as to correspond to a desired amount of residual chlorine by means of a seawater supply pump and flow rate control valves under the control of a control system and supplying the adjusted flow rate of cooled seawater to an electrolysis module (at a step S104); adjusting a concentration of sodium hypochlorite in the cooled seawater supplied to the electrolysis module to correspond to the desired amount of residual chlorine and producing the concentration-adjusted sodium hypochlorite, while adjusting an amount of current, under the control of the control system to which the information on the measurement of salt, flow rate and residual chlorine in the cooled seawater is sent (at a step S105); separating hydrogen gas contained in the sodium hypochlorite produced in the electrolysis module (at a step S106); supplying the sodium hypochlorite from which the hydrogen gas is removed to the ballast water flowing into a ballast tank and disinfecting the ballast water (at a step S107); storing the disinfected ballast water in the ballast tank (at a step S108); continuously or intermittently circulating a predetermined amount of cooled seawater to the electrolysis module whose activation stops and preventing the pollution of the electrolysis module (at a step 112); controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which the information on the amount of residual chlorine measured in the ballast water discharged from the ballast tank to the outside of a ship (at a step S109); generating vortexes in the ballast water to which the reducing agent is mixed to allow the reducing process for the ballast water to be accelerated (at a step S110); and discharging the ballast water to sea (at a step S111).

INDUSTRIAL APPLICABILITY

As set forth in the foregoing, there is provided the apparatus and the method for treating ballast water that produces sodium hypochlorite continuously in accordance with the flow rates of the ballast water flowing to the ballast tank or discharged from the ballast tank to supply the produced sodium hypochlorite to seawater lines, thereby removing the variations of the concentration of the sodium hypochlorite, and performs the reducing process for the ballast water discharged through the ballast tank to sea by means of the injection of the reducing agent to allow the ballast water to be discharged in a state of harmlessness, thereby basically preventing the sea pollution.

According to the present invention, further, there is provided the apparatus and the method for treating ballast water that precisely controls the production of the disinfectant through electrolysis and the injection amount of the disinfectant in accordance with the flow rates of the ballast water flowing into the ballast tank or discharged from the ballast tank, thereby managing the ballast water of the ship to prevent marine ecosystems from being destructed or disturbed.

According to the present invention, moreover, there is provided the apparatus and the method for treating ballast water that removes the hydrogen gas generated after the electrolysis in the electrolysis module where the electrolysis for seawater is carried out to generate the sodium hypochlorite therefrom, thereby avoiding the explosion in the ballast tank.

According to the present invention, additionally, there is provided the apparatus and the method for treating ballast water that circulates seawater periodically or continuously and prevents pollution sources from sticking to the electrolysis module during the activation of the electrolysis module generating sodium hypochlorite stops, thereby ensuring the stability of the equipment and increasing the durability thereof.

According to the present invention, also, there is provided the apparatus and the method for treating ballast water that controls the flow rate of the ballast water or cooled seawater used as a raw material of sodium hypochlorite in accordance with the concentration of NaCl in the seawater and constantly maintains the current efficiency of the electrolysis module, thereby preventing the treatment efficiency from being lowered in accordance with salt contents different by port and providing the reliability.

According to the present invention, lastly, there is provided the apparatus and the method for treating ballast water that makes use of cooled seawater as raw water flowing along a cooling water system to supply the cooled seawater to an electrolysis module where sodium hypochlorite is generated, so that the seawater having a predetermined temperature or more is supplied, thereby enhancing the electrolysis efficiency.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A method for treating ballast water, comprising the steps of:
   allowing the ballast water to flow from seawater intake line to pre-processing filter;
   filtering aquatic microorganisms from the ballast water flowing;
   adjusting a flow rate of the ballast water so as to correspond to a desired amount of residual chlorine by means of a seawater supply pump and flow rate control valves under the control of a control system and supplying the adjusted flow rate of ballast water to an electrolysis module;
   adjusting a concentration of sodium hypochlorite in the ballast water supplied to the electrolysis module to correspond to the desired amount of residual chlorine and producing the concentration-adjusted sodium hypochlorite, while adjusting an amount of current, under the control of the control system to which information on measurements of salt, flow rate and residual chlorine in the ballast water is sent;
   separating hydrogen gas contained in the sodium hypochlorite produced in the electrolysis module;
   supplying the sodium hypochlorite from which the hydrogen gas is removed to the ballast water flowing into a ballast tank and disinfecting the ballast water;
   storing the disinfected ballast water in the ballast tank;
   controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which information on the amount of residual chlorine measured in the ballast water discharged from the ballast tank to the outside of a ship;
   generating vortexes in the ballast water to which the reducing agent is mixed to allow the reducing process for the ballast water to be accelerated; and
   discharging the ballast water to sea.

2. The method for treating ballast water according to claim 1, further comprising the step of continuously or intermittently circulating a predetermined amount of ballast water to the electrolysis module whose activation stops and preventing the pollution of the electrolysis module, after the step of storing the disinfected ballast water in the ballast tank.

3. A method for treating ballast water, comprising the steps of:
   filtering aquatic microorganisms from ballast water flowing;
   storing the ballast water from which the aquatic microorganisms are removed into a ballast tank;
   adjusting a flow rate of the ballast water so as to correspond to a desired amount of residual chlorine by means of a seawater supply pump and flow rate control valves under the control of a control system and supplying the adjusted flow rate of ballast water to an electrolysis module;
   adjusting a concentration of sodium hypochlorite in the ballast water supplied to the electrolysis module to correspond to the desired amount of residual chlorine and producing the concentration-adjusted sodium hypochlorite, while adjusting an amount of current, under the control of the control system to which information on measurements of salt, flow rate and residual chlorine in the ballast water is sent;

separating hydrogen gas contained in the sodium hypochlorite produced in the electrolysis module;

supplying the sodium hypochlorite from which the hydrogen gas is removed to the ballast water flowing along a seawater discharge line discharged to the outside of a ship into a ballast tank and disinfecting the ballast water;

firstly generating vortexes in the ballast water having the sodium hypochlorite residual therein;

controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which information on the amount of residual chlorine measured in the ballast water discharged from the ballast tank to the outside of the ship;

secondarily generating vortexes in the ballast water to which the reducing agent is mixed to allow the reducing process for the ballast water to be accelerated; and discharging the ballast water to sea.

4. The method for treating ballast water according to claim 3, further comprising the step of continuously or intermittently circulating a predetermined amount of ballast water to the electrolysis module whose activation stops and preventing the pollution of the electrolysis module, after the step of discharging the ballast water to sea.

5. A method for treating ballast water, comprising the steps of:

allowing the ballast water to flow from seawater intake line to pre-processing filter;

filtering aquatic microorganisms from the ballast water flowing;

selectively allowing cooled seawater from a cooling seawater line before heat exchange and from a cooling seawater line after heat exchange to flow;

filtering aquatic microorganisms from the cooled seawater flowing;

adjusting a flow rate of the cooled seawater so as to correspond to a desired amount of residual chlorine by means of a seawater supply pump and flow rate control valves under the control of a control system and supplying the adjusted flow rate of cooled seawater to an electrolysis module;

adjusting a concentration of sodium hypochlorite in the cooled seawater supplied to the electrolysis module to correspond to the desired amount of residual chlorine and producing the concentration-adjusted sodium hypochlorite, while adjusting an amount of current, under the control of the control system to which information on measurements of salt, flow rate and residual chlorine in the cooled seawater is sent;

separating hydrogen gas contained in the sodium hypochlorite produced in the electrolysis module;

supplying the sodium hypochlorite from which the hydrogen gas is removed to the ballast water flowing into a ballast tank and disinfecting the ballast water;

storing the disinfected ballast water in the ballast tank;

controlling an amount of reducing agent to correspond to the desired amount of residual amount, mixing the controlled amount of reducing agent with a predetermined amount of ballast water to form micro bubbles from the mixture, injecting the micro bubbles into the ballast water, and performing a reducing process for the ballast water, under the control of the control system to which information on the amount of residual chlorine measured in the ballast water discharged from the ballast tank to the outside of a ship;

generating vortexes in the ballast water to which the reducing agent is mixed to allow the reducing process for the ballast water to be accelerated; and discharging the ballast water to sea.

6. The method for treating ballast water according to claim 5, further comprising the step of continuously or intermittently circulating a predetermined amount of cooled seawater to the electrolysis module whose activation stops and preventing the pollution of the electrolysis module, after the step of storing the disinfected ballast water in the ballast tank.

7. The method for treating ballast water according to claim 1, wherein the vortexes are generated by a vortex generator disposed in a seawater discharge line.

8. The method for treating ballast water according to claim 1, wherein the microbubbles are generated by a micro bubble generator by pressurizing or pulverizing an outside ambient air.

* * * * *